(12) United States Patent
Takahashi et al.

(10) Patent No.: US 9,622,312 B2
(45) Date of Patent: Apr. 11, 2017

(54) DRIVE CIRCUIT, ILLUMINATION SOURCE, AND LIGHTING DEVICE

(71) Applicant: Panasonic Intellectual Property Management Co., Ltd., Osaka (JP)

(72) Inventors: Akira Takahashi, Osaka (JP); Kazuhiko Itoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 65 days.

(21) Appl. No.: 14/442,647

(22) PCT Filed: Nov. 13, 2013

(86) PCT No.: PCT/JP2013/006670
§ 371 (c)(1),
(2) Date: May 13, 2015

(87) PCT Pub. No.: WO2014/087581
PCT Pub. Date: Jun. 12, 2014

(65) Prior Publication Data
US 2016/0286617 A1    Sep. 29, 2016

(30) Foreign Application Priority Data

Dec. 7, 2012  (JP) .................................. 2012-268670
Jan. 22, 2013  (JP) .................................. 2013-008910

(51) Int. Cl.
H05B 37/00    (2006.01)
H05B 33/08    (2006.01)

(52) U.S. Cl.
CPC ..... H05B 33/0845 (2013.01); H05B 33/0815 (2013.01); H05B 33/0818 (2013.01); Y02B 20/383 (2013.01)

(58) Field of Classification Search
CPC .... H05B 33/0815; H05B 37/02; H05B 39/04; H05B 39/048; H05B 33/08;
(Continued)

(56) References Cited

U.S. PATENT DOCUMENTS 8,258,706 B2    9/2012  Maruyama et al.
8,810,135 B2    8/2014  Maruyama et al.
(Continued)

FOREIGN PATENT DOCUMENTS

JP    05-315083    11/1993
JP    09-311729    12/1997
(Continued)

OTHER PUBLICATIONS

International Search Report for corresponding International Application No. PCT/JP2013/006670 mailed Feb. 25, 2014.
(Continued)

Primary Examiner — Monica C King
(74) Attorney, Agent, or Firm — Renner, Otto, Boisselle & Sklar, LLP

(57) ABSTRACT

A drive circuit (1) according to the present invention is a drive circuit which causes an LED module (4) to emit light, using a dimming signal which is an alternating current signal which has been phase-controlled in response to a dimming level, the drive circuit (1) including a control signal generating unit (8) which integrates a voltage of a rectified dimming signal to generate a control signal for controlling the luminance of the LED module (4), the voltage being greater than or equal to a first voltage and less than or equal to a second voltage less than a maximum voltage of the dimming signal.

11 Claims, 17 Drawing Sheets

(58) Field of Classification Search
CPC ............ H05B 33/0803; H05B 33/0818; H05B 33/0824; H05B 33/0845; H05B 33/0848; H05B 33/0851; H05B 33/0854; H05B 39/044; H05B 41/2827
See application file for complete search history.

(56) References Cited

U.S. PATENT DOCUMENTS

2010/0026208 A1* 2/2010 Shteynberg ........ H05B 33/0815
 315/297
2010/0090604 A1 4/2010 Maruyama et al.
2013/0026946 A1* 1/2013 Maruyama ......... H05B 33/0803
 315/246

FOREIGN PATENT DOCUMENTS

| JP | 2011-108529 | 6/2011 |
| JP | 2011-243325 | 12/2011 |
| JP | 4943402 | 3/2012 |
| WO | WO 2011/042510 | 4/2011 |

OTHER PUBLICATIONS

Form PCT/ISA/237 for corresponding International Application No. PCT/JP2013/006670 dated Feb. 25, 2014.

* cited by examiner

US 9,622,312 B2

DRIVE CIRCUIT, ILLUMINATION SOURCE, AND LIGHTING DEVICE

TECHNICAL FIELD

The present invention relates to a drive circuit for causing a light-emitting element to emit light, and an illumination source and a lighting device which include the drive circuit.

BACKGROUND ART

In recent years, illumination apparatuses using light-emitting elements such as a light-emitting diode (LED) or an organic EL element have become popular as a long-life illumination apparatuses that have low power consumption. While commercialization of illumination apparatuses is such gaining a market share, a great number of products that have dimming functionality are also sold.

In consequence, for such an illumination apparatus which includes an LED, a circuit is conventionally proposed which supplies the LED with a current using a dimming signal output from a phase-control dimmer for incandescent bulb (e.g., see Patent Literature (PTL) 1).

PTL 1 discloses drawing a current from a current supply line which supplies a current for driving the LED if a current input to an LED drive circuit which drives the LED is an unwanted current. Hence, the configuration disclosed in PTL 1 can prevent the LED from being unnecessarily turned on, thereby enhancing power efficiency.

CITATION LIST

Patent Literature

PTL 1 Japanese Patent No. 4943402

SUMMARY OF INVENTION

Technical Problem

The phase-control dimmer mentioned above varies the firing angle of the dimming signal in response to changes in dimming level to change the brightness of the illumination apparatus. Unfortunately, if the phase-control dimmer mentioned above is applied to an illumination apparatus which includes an LED, the brightness of the LED abruptly changes as the dimming level is changed.

Specifically, if an incandescent bulb is used in the illumination apparatus, the brightness corresponds to an effective value of power input to the incandescent bulb. Thus, the brightness of the incandescent bulb responds in linearly proportional to the dimming level. In contrast, if an LED is used in the illumination apparatus, the brightness corresponds to an amount of a current flowing through the LED. The brightness of the LED thus does not respond in linearly proportional to the dimming level.

In the conventional circuit disclosed in the above-described PTL 1 which draws the current from the current supply line, although preventing the LED from being unnecessarily turned on, the problem is not ameliorated in which the brightness of the LED abruptly changes in response to changing dimming level.

Thus, the present invention is made in light of the above problem and has a first object to provide a drive circuit and the like for controlling the abrupt change in brightness of a light-emitting element in response to changes in dimming level.

An illumination source and illumination apparatus are required to reduce noise generated therefrom so that the noise does not provide, for example, radio interference to another device. For example, in Japan, conducted emission of illumination sources and illumination apparatuses is regulated by Electrical Appliance and Material Safety Law (well known as PSE law).

The configuration disclosed in PTL 1, however, may not ameliorate the noise problem while malfunction of a dimmer can be prevented.

The present invention is thus made in light of the above problems and has a second object to provide a drive circuit and the like which can reduce the malfunction of a dimmer as well as reducing noise.

Solution to Problem

To achieve the first object above, a drive circuit according to an aspect of the present invention is a drive circuit for causing a light-emitting element to emit light, using a dimming signal which is an alternating current signal which has been phase-controlled in response to a dimming level, the drive circuit including a control signal generating unit configured to integrate a voltage of a signal obtained by rectifying the dimming signal to generate a control signal for controlling luminance of the light-emitting element, the voltage being greater than or equal to a first voltage and less than or equal to a second voltage lower than a maximum voltage of the dimming signal.

For example, the drive circuit may further include a first rectifier circuit which rectifies the dimming signal, wherein the control signal generating unit includes: a first resistor, a second resistor, and a third resistor serially connected between output terminals of the first rectifier circuit; a first capacitor connected in parallel to the third resistor; and a first Zener diode connected in parallel to the second resistor and the third resistor and serially connected to the first resistor, and the control signal generating unit is configured to output as the control signal a voltage corresponding to a voltage stored in the first capacitor.

For example, the control signal generating unit may further be serially connected to the first resistor, the second resistor, and the third resistor, and include a constant voltage circuit serially connected to the first Zener diode, wherein the constant voltage circuit may be connected to a high side of the first Zener diode.

For example, the constant voltage circuit may be a second Zener diode.

For example, the control signal generating unit may further include a voltage divider circuit which divides the voltage rectified by the first rectifier circuit, and the constant voltage circuit may include a switching element which turns on or off, depending on a voltage obtained by the voltage divider circuit dividing the voltage rectified by the first rectifier circuit, the switching element being serially connected to the first resistor, the second resistor, and the third resistor.

For example, the drive circuit may further include a first emission control circuit which converts, into a current, a voltage indicated by the control signal generated by the control signal generating unit and supplies the light-emitting element with the current, to cause the light-emitting element to emit light.

For example, to also achieve the second object above, the drive circuit may further include: a second capacitor connected between output ends of a second rectifier circuit which rectifies the dimming signal; a fourth resistor connected in parallel to the second capacitor; and a bypass circuit connected in parallel to the fourth resistor, wherein the bypass circuit may include a fifth resistor and a switch which are serially connected, the switch may turn on if a voltage between the output ends of the second rectifier circuit is less than or equal to a predetermined threshold voltage, and the second capacitor, the fourth resistor, and the fifth resistor respectively may have capacitance, resistance, and resistance that satisfy the following relations, provided that $t1=C \times R1 \times (InV0-InVth)$ and $t2=C \times R2 \times (InVth)$: $C>0.047$ μF; and $t1+t2<1/(3.3 \times fs)$, where C represents the capacitance of the second capacitor, R1 represents the resistance of the fourth resistor, R2 represents the resistance of the fifth resistor, Vth represents the predetermined threshold voltage, V0 represents amplitude of the alternating current signal, and fs represents a frequency of the alternating current signal.

For example, the fifth resistor may have one end connected to one end of the fourth resistor, and the other end connected via the switch to the other end of the fourth resistor.

For example, the switch may be off across a phase angle range of the alternating current signal, the phase angle range being greater than a phase angle at which the voltage of the alternating current signal is brought to zero and less than or equal to a phase angle at which the dimming signal rises.

For example, the drive circuit may further include a second emission control circuit which converts the dimming signal into a current and supplies the light-emitting element with the current, to cause the light-emitting element to emit light.

For example, the present invention can be implemented not only in the drive circuit, but also in an illumination source which includes the drive circuit described above, or in a lighting device which includes the illumination source.

For example, to achieve the second object above, a drive circuit according to another aspect of the present invention is a drive circuit which includes: a second capacitor connected between output ends of a second rectifier circuit which rectifies the dimming signal; a fourth resistor connected in parallel to the second capacitor; and a bypass circuit connected in parallel to the fourth resistor, wherein the bypass circuit includes a fifth resistor and a switch which are serially connected, the switch turns on if a voltage between the output ends of the second rectifier circuit is less than or equal to a predetermined threshold voltage, and the second capacitor, the fourth resistor, and the fifth resistor respectively have capacitance, resistance, and resistance that satisfy the following relations, provided that $t1=C \times R1 \times (InV0-InVth)$ and $t2=C \times R2 \times (InVth):C>0.047$ μF; and $t1+t2<1/(3.3 \times fs)$, where C represents the capacitance of the second capacitor, R1 represents the resistance of the fourth resistor, R2 represents the resistance of the fifth resistor, Vth represents the predetermined threshold voltage, V0 represents amplitude of the alternating current signal, and fs represents a frequency of the alternating current signal.

Advantageous Effects of Invention

According to one aspect of the present invention, abrupt change in brightness of the light-emitting element in response to changes in dimming level is controllable.

Moreover, according to another aspect of the present invention, noise, and the malfunction of the dimmer can be reduced.

DESCRIPTION OF EMBODIMENTS

Hereinafter, embodiments of a drive circuit, an illumination source, and a lighting device according to the present invention will be described, with reference to the accompanying drawings. The embodiments and variations thereof described below are each merely an illustration of the present invention. Values, shapes, materials, components, and arrangement and connection between the components shown in the following embodiments and variations are merely illustrative and are not intended to limit the present invention. Therefore, among the components of the embodiments and variations below, components not recited in any one of the independent claims are described as arbitrary components.

Embodiment 1

First, a drive circuit according to an embodiment 1 of the present invention will be described.

Figure 1:
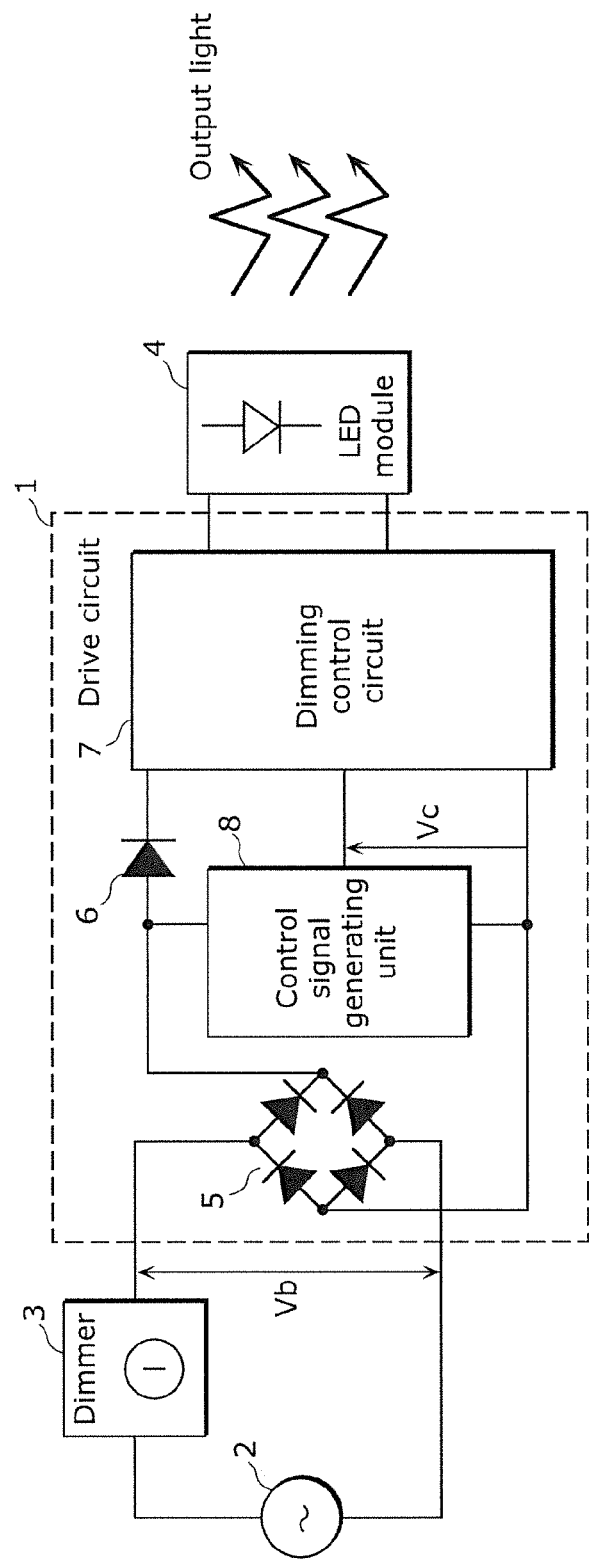
FIG. 1 is a schematic block diagram of a drive circuit according to an embodiment 1.

FIG. 1 is a schematic block diagram of the drive circuit according to the present embodiment. It should be noted that FIG. 1 additionally shows an AC power source 2 which supplies a drive circuit 1 with an alternating current signal, a dimmer 3 which generates a dimming signal corresponding to a dimming level, and a light-emitting element (here, an LED module 4) which is turned on by the drive circuit 1.

The drive circuit 1 turns the light-emitting element (here, the LED module 4) on at brightness (hereinafter, also referred to as luminance) corresponding to the dimming signal input from the dimmer 3. The drive circuit 1 includes a diode bridge 5, a backflow prevention diode 6, a dimming control circuit 7, and a control signal generating unit 8.

The AC power source 2 supplies an alternating current, and is, for example, a mains supply of 100 V.

The dimmer 3 is a phase-control dimmer which converts the alternating current signal supplied by the AC power source 2 into a dimming signal. The dimming signal is a signal which has an AC voltage waveform a fraction of which is cut off. The dimmer 3 phase-controls the alternating current signal, according to the dimming level, to covert it into a dimming signal. More specifically, the dimmer 3 converts the input alternating current signal into a dimming signal which is a signal which has a zero voltage across a phase angle range corresponding to the dimming level.

Figure 2:
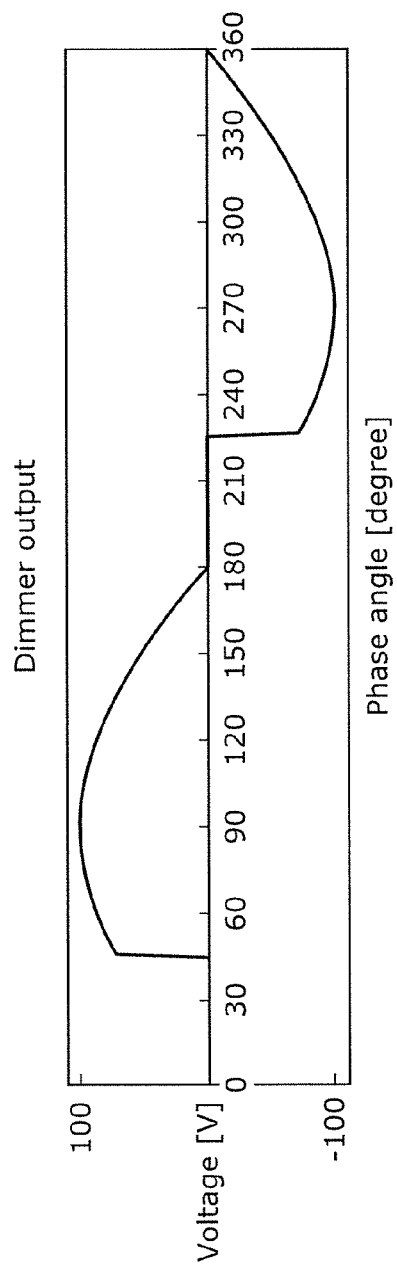
FIG. 2 is a graph depicting an example of a waveform of a dimming signal.

For example, the dimmer 3 generates a dimming signal as shown in FIG. 2. FIG. 2 is a graph depicting an example of a waveform of the dimming signal generated by the dimmer 3.

As shown in the figure, the dimmer 3 sets a voltage of the input alternating current signal to 0 V across the phase angle range corresponding to a designated dimming level, to generate the dimming signal. Specifically, referred to the phase angle of 0 degree, which is an angle of a phase when an AC voltage is 0 V (also referred to as zero-crossing), the dimmer 3 sets the voltage of the alternating current signal to 0 V across a phase angle range from the phase angle of 0 degree to a phase angle (e.g., 45 degree) corresponding to the designated dimming level. The dimmer 3 then raises the voltage of the dimming signal at the phase angle corresponding to the designated dimming level to a voltage of the alternating current signal supplied by the AC power source 2. Such a phase angle at which the dimmer 3 raises the dimming signal is known as a firing angle.

It should be noted that the dimming signal generated by the dimmer 3 is not limited to a signal of a leading edge type in which a leading edge of an alternating current signal is cut off as a function of the dimming level, as shown in FIG. 2. Specifically, the dimming signal may be a phase-controlled dimming signal, for example, a signal of a trailing edge type.

The LED module 4 is one aspect of the light-emitting element and emits light which has brightness corresponding to the current supplied by the drive circuit 1. In other words, the LED module 4 illuminates at a luminance corresponding to the current supplied by the drive circuit 1. The LED module 4 includes, for example, a plurality of LED chips mounted on one side of the mounting board. It should be noted that the light-emitting element may be other than an LED, and, for example, a semiconductor laser, an organic EL element, or an inorganic EL element may be used.

Figure 3:
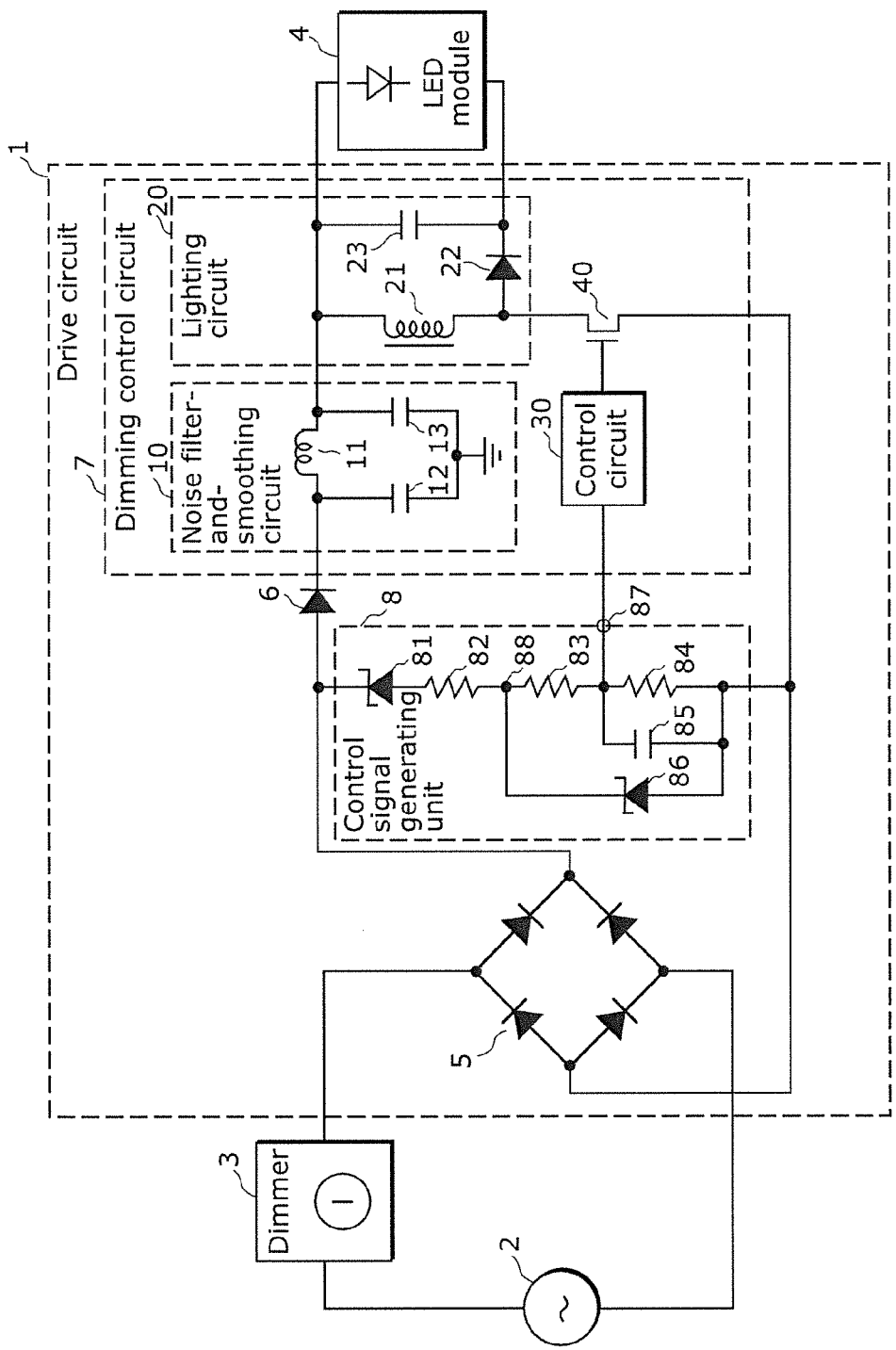
FIG. 3 is a circuit diagram showing detailed configuration of the drive circuit.

Next, referring to FIG. 3, detailed configuration of the drive circuit 1 shown in FIG. 1 will be described. FIG. 3 is a circuit diagram showing detailed configuration of the drive circuit 1. It should be noted that FIG. 3, as with FIG. 1, additionally shows the AC power source 2, the dimmer 3, and the LED module 4.

The diode bridge 5 rectifies the dimming signal output from the dimmer 3 and outputs the rectified dimming signal to a subsequent component, i.e., the control signal generating unit 8. The dimmer 3 and the AC power source 2 are connected between input terminals of the diode bridge 5, and the control signal generating unit 8 is connected between output terminals of the diode bridge 5. It should be noted that the circuits (the diode bridge 5, the diode 6, the dimming control circuit 7, and the control signal generating unit 8) included in the drive circuit 1 use potential at the low-side output terminal of the diode bridge 5 as reference potential. It should be noted that the diode bridge is one aspect of a first rectifier circuit The backflow prevention diode 6 has an input terminal connected to the high-side output terminal of the diode bridge 5 and the control signal generating unit 8, and has an output terminal connected to the dimming control circuit 7. This prevents backflow of the current from the dimming control circuit 7, which is a subsequent circuit following the diode 6, back to the control signal generating unit 8, which is a preceding circuit followed by the diode 6.

The dimming control circuit 7 converts into a current a voltage indicated by a control signal generated by the control signal generating unit 8, and supplies the current to the LED module 4, thereby causing the LED module 4 to emit light. The dimming control circuit 7 includes a noise filter-and-smoothing circuit 10, a lighting circuit 20, a control circuit 30, and a switching element 40. It should be noted that the dimming control circuit 7 is one aspect of a first emission control circuit.

The noise filter-and-smoothing circuit 10 removes noise from the rectified dimming signal output from the diode 6, and smoothes the rectified dimming signal. The noise filter-and-smoothing circuit 10 includes a coil 11, and capacitors 12 and 13.

The lighting circuit 20 receives input of a DC voltage smoothed, rectified, and output from the noise filter-and-smoothing circuit 10, and generates a current to be supplied to the LED module 4. Specifically, the lighting circuit 20 includes a choke coil 21 for chopping an input signal voltage, a diode 22 for regenerating energy accumulated in the choke coil 21, and a smoothing capacitor 23. The choke coil 21, the diode 22, and the LED module 4 are connected so as to form a circuit loop. The capacitor 23 is connected in parallel to the LED module 4 and smoothes an output voltage (and an output current) of the lighting circuit 20.

The control circuit 30 and the switching element 40 drive the current through the choke coil 21 included in the lighting circuit 20, in response to the control signal output from the control signal generating unit 8. Specifically, the control circuit 30 turns the switching element 40 on and off, depending on a voltage of the control signal output from the control signal generating unit 8, thereby allowing and preventing the current flow through the choke coil 21. For example, the control circuit 30 generates a pulse frequency modulation (PFM) signal which has a frequency according to the input control signal, so that the higher the voltage of the control signal input is, the higher the frequency the PFM signal generated has. Consequently, the higher the frequency of the PFM signal is the more the energy is accumulated by the switching element 40 into the choke coil 21.

Thus, the higher the voltage of the control signal input from the control signal generating unit 8 to the control circuit 30 is, the larger the current the control circuit 30 and the switching element 40 pass through the choke coil 21. In other words, the higher the voltage of the control signal is the larger the current passes through the LED module 4, thereby increasing the luminance of the LED module 4. In other words, the higher the voltage of the control signal is the brighter the LED module 4 is illuminated.

It should be noted that the control circuit 30 may turn the switching element 40 on and off by generating a pulse width modulation (PWM) signal, so that the higher the voltage of the input control signal is the higher the duty ratio the PWM signal generated has.

The control signal generating unit 8 extracts a voltage which is of the dimming signal rectified by the diode bridge 5 and is greater than or equal to a first voltage and less than or equal to a second voltage lower than a maximum voltage of the dimming signal, and integrates the extracted voltage. The control signal generating unit 8 then outputs the integrated voltage as a control signal to the control circuit 30. Specifically, the control signal generating unit 8 is connected to and interposed between a high-side output end and a low-side output end of the diode bridge 5, includes a Zener diode 81, a resistor 82, a resistor 83, and a resistor 84 serially connected in the listed order starting from the high-side output end of the diode bridge 5, a capacitor 85 connected in parallel to the resistor 84, a Zener diode 86 connected in parallel to the resistor 83 and the resistor 84, and has an output terminal 87 which is connected at a nodal point between the resistor 83 and the resistor 84 and outputs the control signal.

The Zener diode 81 is reverse biased and has a predetermined breakdown voltage (e.g., 36 V). This causes the Zener diode 81 to serve as a constant voltage circuit which maintains a voltage across the Zener diode 81 to the predetermined breakdown voltage if the voltage has exceeded the predetermined breakdown voltage. If the voltage across the Zener diode 81 is equal to or less than the predetermined breakdown voltage, on the other hand, the Zener diode 81 does not pass a current through the Zener diode 81. Specifically, the Zener diode 81 has a cathode connected to the high-side output end of the diode bridge 5 and an anode connected to one end of the resistor 82.

The resistor 82, the resistor 83, and the resistor 84 are serially connected to the Zener diode 81 in the listed order and one end of the resistor 84 is connected to the low-side output end of the diode bridge 5.

The capacitor 85 is connected in parallel to the resistor 84, specifically, the capacitor 85 has one end connected to the nodal point between the resistor 83 and the resistor 84, and has the other end connected to the low-side output end of the diode bridge 5. This allows the capacitor 85 to store a voltage that is at the nodal point between the resistor 83 and the resistor 84. Thus, the voltage stored in the capacitor 85 appears as the control signal on the output terminal 87 of the control signal generating unit 8.

The Zener diode 86 is reverse biased, in parallel, to the resistor 83 and the resistor 84, and has a predetermined breakdown voltage (e.g., 22 V). This causes the Zener diode 86 to serve as a constant voltage circuit which maintains a voltage across the Zener diode 86 to the predetermined breakdown voltage if the voltage has exceeded the predetermined breakdown voltage. If the voltage across the Zener diode 86 is equal to or less than the predetermined breakdown voltage, on the other hand, the Zener diode 86 does not pass a current through the Zener diode 86. Specifically, the Zener diode 86 has a cathode connected to the nodal point between the resistor 83 and the resistor 84 and an anode connected to the low-side output end of the diode bridge 5.

As described above, the control signal generating unit 8 includes: the resistors 82 to 84 serially connected between the output terminals of the diode bridge 5; the capacitor 85 connected in parallel to the resistor 84; and the Zener diode 86 connected in parallel to the resistors 83 and 84 and serially connected to the resistor 82, and outputs, as the control signal, a voltage corresponding to the voltage stored in the capacitor 85. The control signal generating unit 8 further includes the Zener diode 81 serially connected to the resistors 82 to 84 and serially connected to the Zener diode 86.

It should be noted that the resistors 82, 83, and 84 are one aspect of a first resistor, a second resistor, and a third resistor, respectively, the Zener diode 86 is one aspect of a first Zener diode, the Zener diode 81 is one aspect of a second Zener diode, and the capacitor 85 is one aspect of a first capacitor.

The control signal generating unit 8 configured in this manner has the following characteristic functionality.

First, for illustrative purposes, a voltage from the output terminal 87 when the Zener diodes 81 and 86 and the capacitor 85 are absent in the control signal generating unit 8 will be described. In this case, the voltage from the output terminal 87 is a voltage obtained by dividing, by the resistors 82 to 84, the voltage of the rectified dimming signal input to the control signal generating unit 8. In the following, the dimming signal before the rectification and the rectified dimming signal will be simply referred to as a dimming signal, without particularly distinguishing therebetween.

Next, a voltage from the output terminal 87 when the circuit thus formed of the resistors 82 to 84 includes the Zener diode 81 will be described.

As described above, the Zener diode 81 serves as the constant voltage circuit if the voltage across the Zener diode 81 is greater than the predetermined breakdown voltage. Hence, if the voltage of the dimming signal is greater than the breakdown voltage of the Zener diode 81, the voltage from the output terminal 87 is a voltage obtained by dividing, by the resistors 82 to 84, the voltage of the dimming signal, which is greater than the breakdown voltage of the Zener diode 81, minus the breakdown voltage of the Zener diode 81. If the voltage of the dimming signal is less than or equal to the breakdown voltage of the Zener diode 81, on the other hand, the voltage from the output terminal 87 is substantially 0 V.

In other words, in a phase angle range of the dimming signal in which the voltage of the dimming signal is greater than the breakdown voltage of the Zener diode 81, the voltage from the output terminal 87 is a voltage obtained by dividing, by the resistors 82 to 84, the voltage of the dimming signal minus the breakdown voltage of the Zener diode 81. In a phase angle range of the dimming signal in which the voltage of the dimming signal is less than or equal to the breakdown voltage of the Zener diode 81, on the other hand, the voltage from the output terminal 87 is substantially 0 V.

Next, the voltage from the output terminal 87 when the circuit formed of such a Zener diode 81 and the resistors 82 to 84 further includes the Zener diode 86 will be described.

As described above, the Zener diode 86 serves as the constant voltage circuit if the voltage across the Zener diode 86 is greater than the breakdown voltage. Hence, a voltage at a node 88, which is a nodal point between the resistor 82 and the resistor 83, does not increase greater than the breakdown voltage of the Zener diode 86. In other words, an upper voltage limit of the node 88 is defined by the breakdown voltage of the Zener diode 86. The voltage from the output terminal 87 is a voltage obtained by dividing the voltage of the node 88 by the resistors 83 and 84.

As a result, an upper voltage limit of the output terminal 87 is a voltage obtained by dividing the breakdown voltage of the Zener diode 86 by the resistors 83 and 84.

Next, the voltage from the output terminal 87 when the circuit formed of such Zener diodes 81 and 86 and the resistors 82 to 84 includes the capacitor 85 will be described.

As described above, with the inclusion of the capacitor 85 the voltage from the output terminal 87 is changed. In other words, the voltage from the output terminal 87 is an integral of a voltage at a phase angle of the dimming signal.

Figure 4:
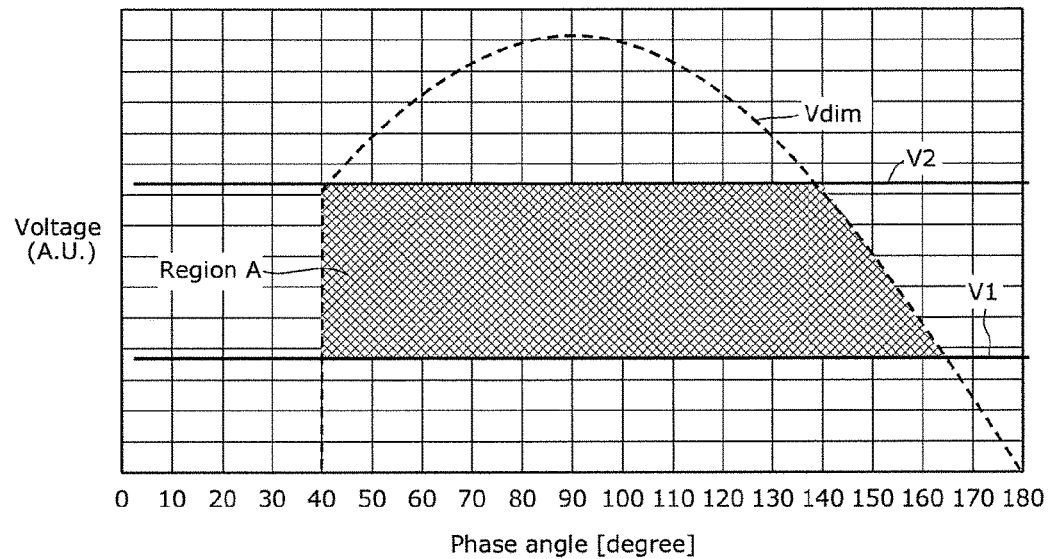
FIG. 4 is a graph for illustrating a voltage of a control signal generated by a control signal generating unit.

From the foregoing, the voltage from the output terminal 87, i.e., the control voltage, is described as below, with reference to FIG. 4. FIG. 4 is a graph for illustrating a voltage of a control signal generated by the control signal generating unit 8. A voltage Vdim of the dimming signal is depicted in the figure.

First, the voltage from the output terminal 87 will be described, assuming the capacitor 85 is absent in the control signal generating unit 8.

As described above, the voltage from the output terminal 87 is a voltage obtained by dividing, by the resistors 82 to 84, the voltage of the dimming signal minus the breakdown voltage of the Zener diode 81 in the phase angle range where the voltage of the dimming signal at the phase angle of the dimming signal is greater than the breakdown voltage of the Zener diode 81.

Specifically, in the phase angle range from less than 165 degrees to 180 degrees or below in FIG. 4, the voltage from the output terminal 87 corresponds to the voltage Vdim of the dimming signal referred to a lower voltage limit V1 defined by the breakdown voltage of the Zener diode 81. More specifically, the voltage from the output terminal 87 is a voltage obtained by dividing the voltage Vdim of the dimming signal referred to the lower voltage limit V1 by the resistors 82 to 84.

Nevertheless, the voltage at the node 88 does not increase greater than the breakdown voltage of the Zener diode 86, as described above. In other words, the voltage from the output terminal 87 does not exceed the voltage obtained by dividing the breakdown voltage of the Zener diode 86 by the resistors 83 and 84.

Specifically, the voltage from the output terminal 87 does not exceed an upper voltage limit V2 defined by the breakdown voltage of the Zener diode 86, as shown in FIG. 4.

Thus, the voltage from the output terminal 87 is as follows:

The voltage from the output terminal 87 corresponds to a difference voltage between the lower voltage limit V1 and a smaller one of the voltage Vdim of the dimming signal and the upper voltage limit V2 in the phase angle range where the voltage of the dimming signal at the phase angle of the dimming signal is greater than the breakdown voltage of the Zener diode 81 (the phase angle range from less than 165 degrees to 180 degrees or below in FIG. 4). The voltage from the output terminal 87, on the other hand, is substantially 0 V in the phase angle range where the voltage Vdim of the dimming signal is less than or equal to the breakdown voltage of the Zener diode 81 (outside the phase angle range from less than 165 degrees to 180 degrees or below in FIG. 4).

The voltage from the output terminal 87 has been described above, assuming the capacitor 85 is absent in the control signal generating unit 8. Next, the voltage from the output terminal 87 when the capacitor 85 is included in the control signal generating unit 8 will be described.

As described above, if the capacitor 85 is included in the control signal generating unit 8, the voltage from the output terminal 87 is the voltage obtained by integrating the voltage, which is output to the output terminal 87 if the capacitor 85 were absent, by the capacitor 85.

In other words, the voltage from the output terminal 87 corresponds to the area of a region A outlined by Vdim, V1, and V2 in FIG. 4.

Specifically, the voltage of the control signal output from the control signal generating unit 8 is determined by a voltage based on the voltage Vdim of the dimming signal corresponding to the phase angle, the lower voltage limit V1 defined by the breakdown voltage of the Zener diode 81, and the upper voltage limit V2 defined by the breakdown voltage of the Zener diode 86. In other words, the control voltage corresponds to the area of the region A in FIG. 4.

In this manner, the control signal generating unit 8 included in the drive circuit 1 according to the present embodiment integrates a voltage of the dimming signal full-rectified by the diode bridge 5, which is greater than or equal to the lower voltage limit V1 and less than or equal to the upper voltage limit V2 less than the maximum voltage of the dimming signal, to generate the control signal for controlling the luminance of the LED module 4.

As described above, the firing angle of the dimming signal varies in response to changes in dimming level. At this time, the area of the region A also varies as the firing angle of the dimming signal varies, as can be seen from FIG. 4. Additionally, the dimming control circuit 7 converts the voltage of the control signal input from the control signal generating unit 8 into a current and supplies the LED module 4 with the current, thereby causing the LED module 4 to emit light, as described above. Hence, it is necessary that the change in area of the region A is in linearly proportional to varying firing angle as much as possible in order to suppress abrupt change in brightness of the LED module 4 in response to changes in dimming level.

In the following, effects obtained from the drive circuit 1 according to the present embodiment will be described, with reference to a comparative example in which the area of the region does not change in linearly proportional to varying firing angle.

Comparative Example

Figure 5A:
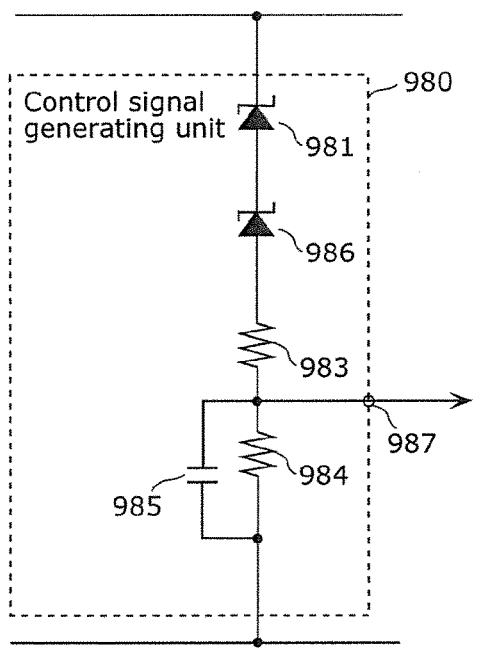
FIG. 5A is a circuit diagram showing configuration of a control signal generating unit according to a comparative example of the embodiment 1.
Figure 5B:
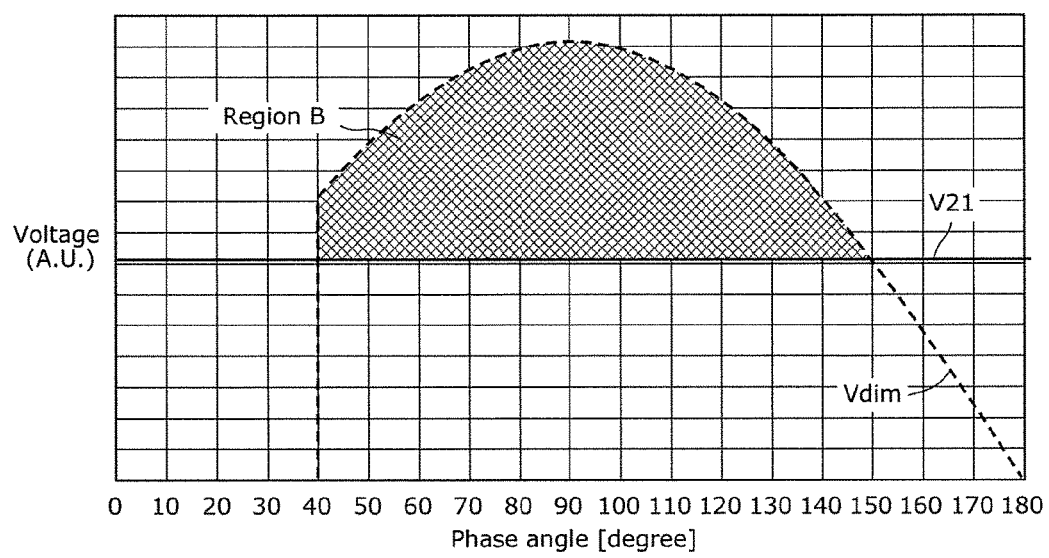
FIG. 5B is a graph for illustrating a voltage of a control signal generated by the control signal generating unit according to the comparative example of the embodiment 1.

First, a drive circuit according to a comparative example of the present embodiment will be described, with reference to FIGS. 5A and 5B. FIG. 5A is a circuit diagram showing configuration of a control signal generating unit in the comparative example of the embodiment 1. FIG. 5B is a graph for illustrating a voltage of a control signal generated by the control signal generating unit according to the comparative example of the embodiment 1. FIG. 5B shows a voltage Vdim of a dimming signal corresponding to a phase angle of the dimming signal, and a lower voltage limit V21 determined by breakdown voltages of Zener diodes 981 and 986.

A control signal generating unit 980 in the comparative example shown in FIG. 5A is different in arrangement of the two Zener diodes 981 and 986, as compared to the control signal generating unit 8 included in the drive circuit 1 according to the present embodiment shown in FIG. 3.

Specifically, the control signal generating unit 980 in the comparative example is connected to and interposed between a high-side output end and a low-side output end of the diode bridge 5, and includes the Zener diode 981, the Zener diode 986, a resistor 983, and a resistor 984 serially connected in the listed order starting from the high-side output end of the diode bridge 5, a capacitor 985 connected in parallel to the resistor 984, an output terminal 987 which is connected to a nodal point between the resistor 983 and the resistor 984 and outputs the control signal. The Zener diode 981, the resistor 983, the resistor 984, and the capacitor 985 are the same as the Zener diode 81, the resistor 83, the resistor 84, and the capacitor 85, respectively, included in the control signal generating unit 8 of the drive circuit 1 according to the embodiment 1. In other words, the control signal generating unit 980 is different from the control signal generating unit 8 mainly in that the Zener diode 986 is serially connected to the resistors 983 and 984.

The control signal generating unit 980 in the comparative example, as with the control signal generating unit 8 of the drive circuit 1 according to the embodiment 1, outputs a voltage stored in the capacitor 985 as a voltage of the control signal. In other words, the control signal generating unit 980 outputs a voltage integrated by the capacitor 985 as a voltage of the control signal.

To describe the voltage from the output terminal 987 of the control signal generating unit 980 configured in this manner, the voltage from the output terminal 987 will be described first, assuming that the capacitor 985 is absent in the control signal generating unit 980.

As described above, the Zener diodes 981 and 986 each serve as a constant voltage circuit if a voltage across the Zener diode is greater than the breakdown voltage.

Thus, if the capacitor 985 is absent in the control signal generating unit 980, the voltage of the output terminal 987 is determined by the voltage Vdim of the dimming signal, a sum of the breakdown voltage of the Zener diode 981 and the breakdown voltage of the Zener diode 986, and dividing of voltage by the resistors 983 and 984.

For example, if the voltage Vdim of the dimming signal is greater than the voltage, which is a sum of the breakdown voltage of the Zener diode 981 and the breakdown voltage of the Zener diode 986, in a phase angle range where the dimming signal is greater than or equal to 40 degrees and less than or equal to 150 degrees, the voltage of the output terminal 987 is a voltage obtained by dividing, by the resistors 983 and 984, the voltage Vdim of the dimming signal minus the voltage which is a sum of the breakdown voltage of the Zener diode 981 and the breakdown voltage of the Zener diode 986.

The voltage from the output terminal 987, on the other hand, is substantially 0 V in the phase angle range where the voltage Vdim of the dimming signal is less than or equal to the voltage, which is a sum of the breakdown voltage of the Zener diode 981 and the breakdown voltage of the Zener diode 986, (e.g., outside the range greater than or equal to 40 degrees and less than or equal to 150 degrees).

The voltage of the output terminal 987 has been described above, assuming the capacitor 985 is absent in the control signal generating unit 980. Next, the voltage of the output terminal 987 when the capacitor 985 is included in the control signal generating unit 980 will be described.

As described above, if the capacitor 985 is included in the control signal generating unit 980, the voltage from the output terminal 987 is the voltage obtained by integrating the voltage, which is output to the output terminal 987 if the capacitor 985 were absent, by the capacitor 985.

In other words, the voltage from the output terminal 987 corresponds to the area of a region B outlined by Vdim and V21 in FIG. 5B.

Specifically, the voltage of the control signal output from the control signal generating unit 980 is determined by the lower voltage limit V21 determined by the voltage Vdim of the dimming signal corresponding to the phase angle, and the voltage which is a sum of the breakdown voltage of the Zener diode 981 and the breakdown voltage of the Zener diode 986. In other words, the control voltage corresponds to the area of the region B in FIG. 5B.

Comparison of Embodiment 1 and Comparative Example

Next, effects obtained from the drive circuit 1 according to the embodiment 1 will be described, comparing the embodiment 1 with the comparative example, with reference to FIGS. 6 through 8.

Figure 6:
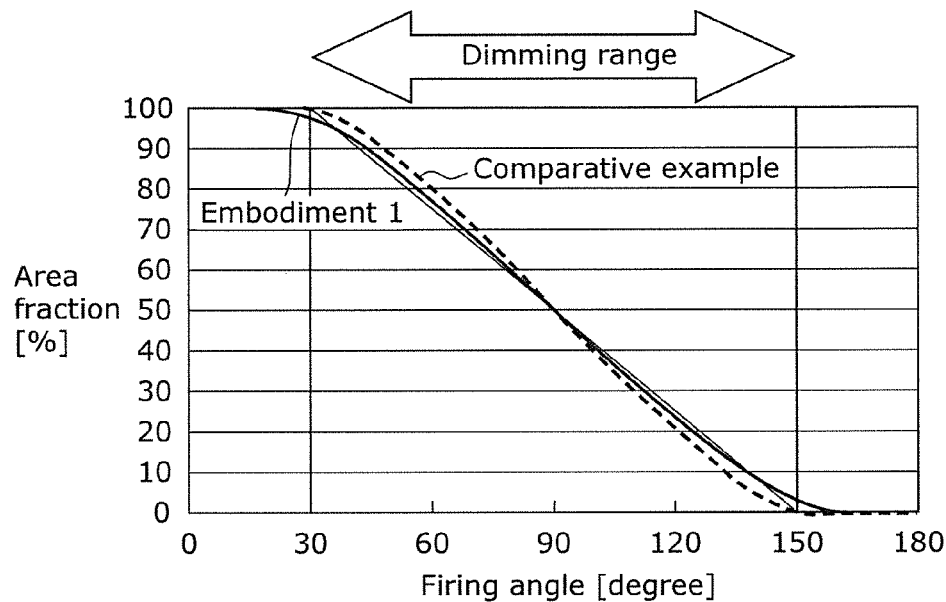
FIG. 6 is a graph depicting a result of simulation of the control signal to a firing angle of the dimming signal.

FIG. 6 is a graph depicting a result of simulation of the control signal to a firing angle of a dimming signal. Specifically, the figure shows a graph depicting the areas of the regions A and B when the firing angle of the dimming signal is varied in FIGS. 4 and 5B.

As shown in FIG. 6, it can be seen that the area fraction varies in more linearly proportional to varying firing angle in the embodiment 1 than the comparative example.

In other words, the area of the region A varies in linearly proportional to varying firing angle of the dimming signal in a phase angle range (40 degrees or greater and 140 degrees or less in FIG. 4) where the upper limit voltage V2 is less than the voltage Vdim of the dimming signal. In contrast, the area of the region B does not vary in linearly proportional to varying firing angle of the dimming signal in any phase angle range.

As a result, as shown in FIG. 6, the area fraction varies in more linearly proportional to varying firing angle in the embodiment 1 than the comparative example.

Figure 7:
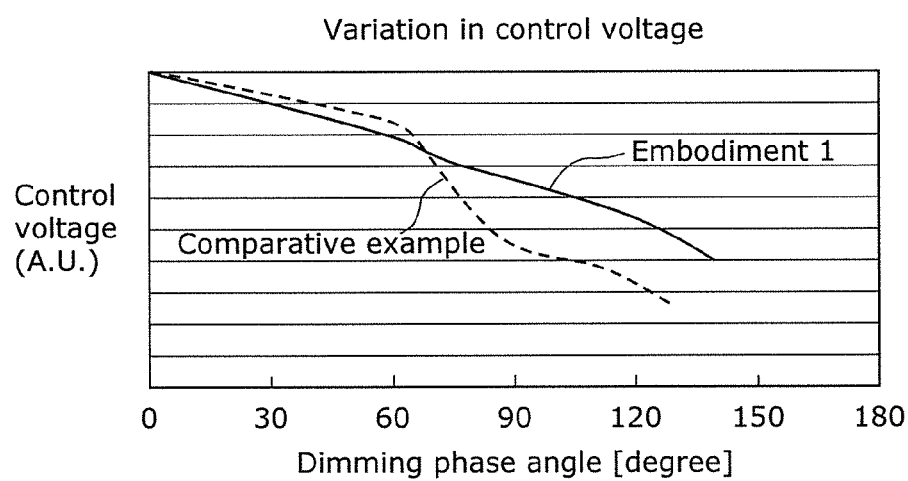
FIG. 7 is a graph depicting a control voltage corresponding to a dimming phase angle.

FIG. 7 is a graph depicting the control voltage, which is the voltage of the control signal, corresponding to a dimming phase angle. Here, the dimming phase angle refers to a phase angle where a firing angle, at which the area fraction starts varying in response to the firing angle shown in FIG. 6, is 0 degree. In other words, the range of the dimming phase angle corresponds to a dimming range in which the dimming level is adjustable.

As shown in FIG. 7, the control voltage decreases with an increase in dimming phase angle in both the embodiment 1 and the comparative example. This is because the control voltage corresponds to the regions A and B, as described above, and thus the control voltage reduces when the area fraction reduces as the firing angle increases as shown in FIG. 6.

At this time, the control voltage in the embodiment 1 varies substantially in linearly proportional to varying dimming phase angle. In other words, the control signal generating unit 8 included in the drive circuit 1 according to the embodiment 1 generates a control voltage which responds substantially in linearly proportional to the dimming level of the dimmer 3.

In contrast, the control voltage in the comparative example varies in significantly disproportional to varying dimming phase angle. Specifically, the control voltage in the comparative example abruptly decreases where the dimming phase angle is greater than or equal to 60 degrees and less than or equal to 90 degrees. In other words, the control signal generating unit 980 in the comparative example cannot generate a control voltage that responds in linearly proportional to the dimming level of the dimmer 3.

The control voltage thus generated is input to a subsequent component, i.e., the dimming control circuit 7, and the dimming control circuit 7 supplies the LED module 4 with a current as a function of the control voltage. As a result, the LED module 4 emits light which has characteristics as shown in FIG. 8.

Figure 8:
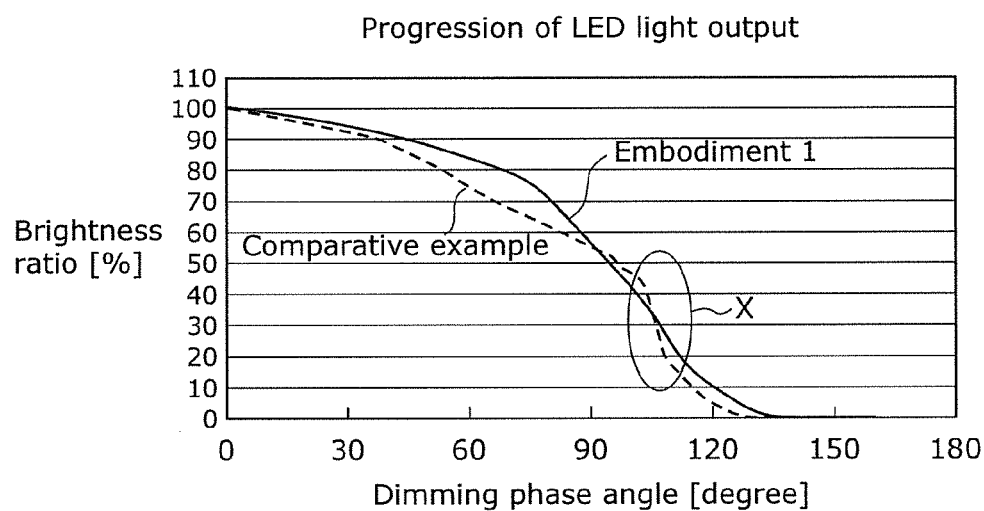
FIG. 8 is a graph depicting a brightness ratio of an LED module corresponding to the dimming phase angle.

FIG. 8 is a graph depicting the brightness ratio of the LED module 4 corresponding to the dimming phase angle.

As shown in the figure, in the embodiment 1, the brightness ratio of the LED module 4 slowly changes in response to varying dimming phase angle. In other words, the drive circuit 1 according to the embodiment 1 can suppress abrupt change in brightness of the LED module 4 in response to changes in dimming level of the dimmer 3.

In the comparative example, in contrast, the brightness ratio of the LED module 4 abruptly changes in response to varying dimming phase angle at some point. Specifically, the brightness ratio reduces at point X in FIG. 8 by about 30%, in response to a slight variation in dimming phase angle. In other words, in the comparative example, the brightness of the LED module 4 is abruptly dimmed in response to changes in dimming level of the dimmer 3.

Summary

As described above, the drive circuit 1 according to the present embodiment is a drive circuit for causing the LED module 4 to emit light, using a dimming signal which is an alternating current signal which has been phase-controlled in response to the dimming level, the drive circuit 1 including the control signal generating unit 8 which integrates a voltage of a rectified dimming signal, which is greater than or equal to the lower voltage limit and less than or equal to the upper voltage limit less than the maximum voltage of the dimming signal, to generate the control signal for controlling the luminance of the LED module 4.

This contributes to suppression of abrupt change in brightness of the LED module 4 in response to changes in dimming level.

Alternatively, the drive circuit 1 may further include the diode bridge 5 which rectifies the dimming signal, the control signal generating unit 8, the resistors 82, 83, and 84 serially connected between the output terminals of the diode bridge 5, the capacitor 85 connected in parallel to the resistor 84, and the Zener diode 86 connected in parallel to the resistor 83 and the resistor 84 and serially connected the resistor 82, and the drive circuit 1 may output, as a control signal, a voltage corresponding to a voltage stored in the capacitor 85.

This prevents the voltage at the node 88 from exceeding the upper voltage limit V2 defined by the breakdown voltage of the Zener diode 86. Hence, the voltage of the control signal, which is a voltage stored in the capacitor 85, can be caused to be responsive in linearly proportional to the firing angle of the dimming signal. In other words, abrupt change in brightness of the LED module 4 in response to changes in dimming level can be suppressed.

Moreover, the control signal generating unit 8 may further include a constant voltage circuit serially connected to the resistors 82 to 84 and serially connected to the Zener diode 86, and the constant voltage circuit may be connected to the high side of the Zener diode 86.

Due to this, the voltage from the output terminal 87 corresponds to a difference voltage between the voltage of the constant voltage circuit and a smaller one of the upper voltage limit V2 and the voltage Vdim of the dimming signal in the phase angle range where the voltage of the dimming signal is greater than the voltage of the constant voltage circuit. Meanwhile, the voltage from the output terminal 87 is substantially 0 V in the phase angle range where the voltage of the dimming signal is less than or equal to the voltage of the constant voltage circuit. Hence, the voltage of the control signal, which is the voltage stored in the capacitor 85, can be caused to be responsive in more linearly proportional to the firing angle of the dimming signal. In other words, abrupt change in brightness of the LED module 4 in response to changes in dimming level can be further suppressed.

For example, the constant voltage circuit may be the Zener diode 81.

This contributes to implementing the constant voltage circuit in a simple circuit structure.

Moreover, the drive circuit 1 according to the present embodiment may further include the dimming control circuit 7 which converts into a current a voltage indicated by the control signal generated by the control signal generating unit 8, and supplies the LED module 4 with the current, thereby causing the LED module 4 to emit light.

Variation of Embodiment 1

A drive circuit according to a variation of the embodiment 1 is generally the same as the drive circuit 1 according to the embodiment 1 except for the configuration of a control signal generating unit. In the following, the control signal generating unit included in the drive circuit according to the variation of the embodiment 1 will be described, mainly focusing on differences from the control signal generating unit 8 included in the drive circuit 1 according to the embodiment 1.

Figure 9:
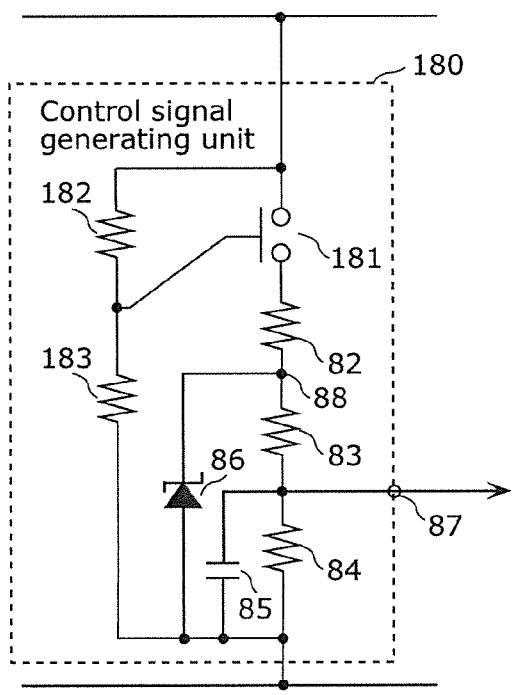
FIG. 9 is a circuit diagram showing configuration of a control signal generating unit included in a drive circuit according to a variation of the embodiment 1.

FIG. 9 is a circuit diagram showing configuration of a control signal generating unit 180 included in the drive circuit according to the variation of the embodiment 1.

The control signal generating unit 180 shown in the figure is generally the same as the control signal generating unit 8 shown in FIG. 3, except the following: the control signal generating unit 180 includes, in place of the Zener diode 81, a switching element 181 serially connected to resistors 82, 83, and 84, and a voltage divider circuit formed of resistors 182 and 183 which divide a voltage rectified by the diode bridge 5; and the switching element 181 turns on and off, depending on a voltage obtained by the voltage divider circuit dividing the voltage rectified by the diode bridge 5.

The resistors 182 and 183 are serially connected to and interposed between output terminals of the diode bridge 5. This brings a voltage at a nodal point between the resistors 182 and 183 to a voltage obtained by dividing, by the resistors 182 and 183, the voltage of the dimming signal rectified by the diode bridge 5.

The switching element 181 is one aspect of a constant voltage circuit and disposed between the high-side output end of the diode bridge 5 and the resistor 82. The switching element 181 turns on or off, depending on the voltage divided by the resistors 182 and 183, specifically, the switching element 181 turns on when the voltage divided by the resistors 182 and 183 is greater than or equal to threshold of the switching element 181, and turns off when the voltage is less than the threshold.

According to the configuration as described above, the voltage from the output terminal 87 of the control signal generating unit 180 is 0 V if the switching element 181 is off.

If the switching element 181 is on, on the other hand, an upper voltage limit of the node 88 is, as with the embodiment 1, defined by the breakdown voltage of the Zener diode 86 even if the voltage of the dimming signal is high. As described above, the voltage from the output terminal 87 is a voltage obtained by dividing the voltage at the node 88 by the resistors 83 and 84. Hence, an upper voltage limit of the output terminal 87 is defined by the breakdown voltage of the Zener diode 86.

In this manner, according to the drive circuit of the variation of the embodiment 1, the control signal generating unit 180 includes the voltage divider circuit (the resistors 182 and 183) which divides the voltage rectified by the diode bridge 5, and the switching element 181, serially connected to the resistors 82 to 84, which turns on and off in response to a voltage obtained by the voltage divider circuit dividing the rectified voltage.

This allows the control signal generating unit 180 to generate a control voltage which responds substantially in linearly proportional to the dimming level, as with the control signal generating unit 8 included in the drive circuit 1 according to the embodiment 1. Thus, the drive circuit according to the variation of the embodiment 1 can suppress abrupt change in brightness of the LED module 4 in response to changes in dimming level, as with the drive circuit 1 according to the embodiment 1.

Embodiment 2

First, a drive circuit according to an embodiment 2 of the present invention will be described.

Figure 10:
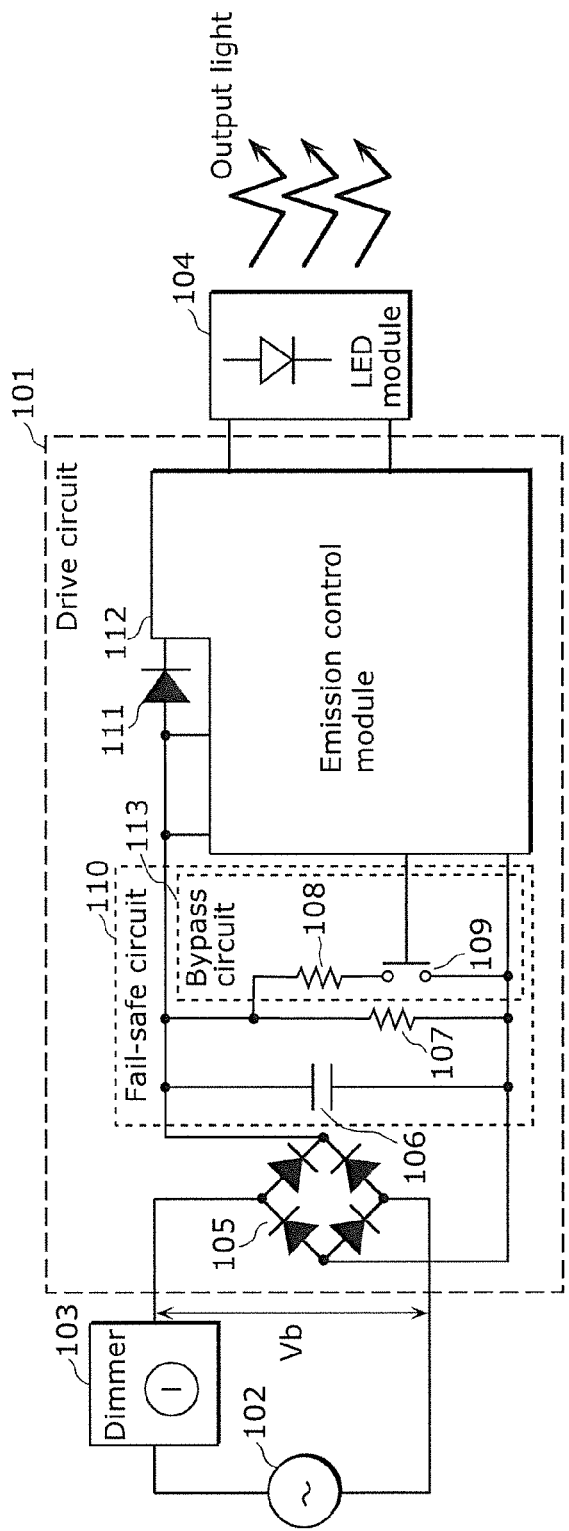
FIG. 10 is a schematic block diagram of a drive circuit according to an embodiment 2.
Figure 11:
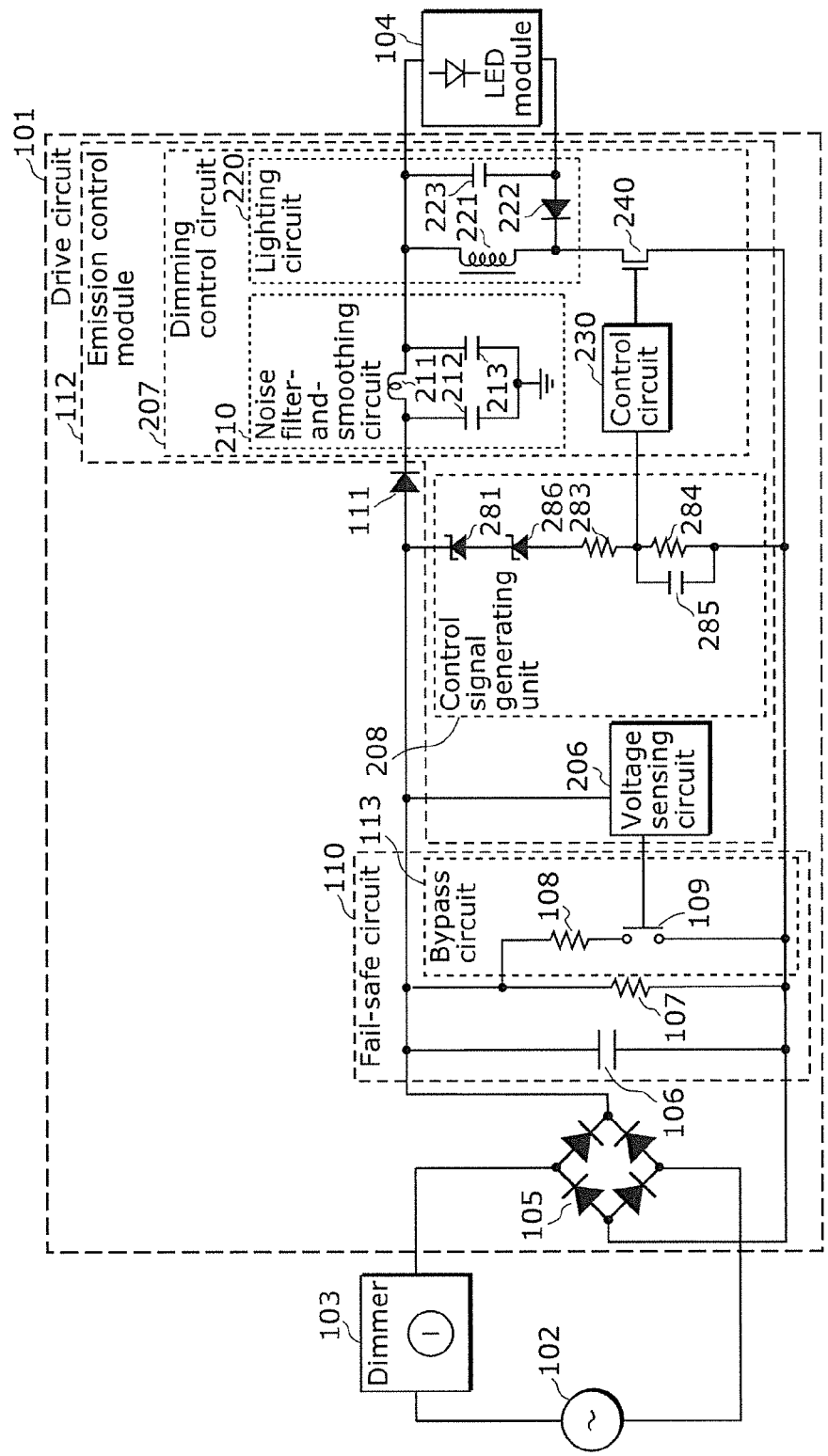
FIG. 11 is a circuit diagram showing detailed configuration of the drive circuit according to the embodiment 2.

FIG. 10 is a schematic block diagram of the drive circuit according to the present embodiment. FIG. 11 is a circuit diagram showing detailed configuration of a drive circuit 101 according to the present embodiment. It should be noted that FIGS. 10 and 11 additionally show an AC power source 102 which supplies the drive circuit 101 with an alternating current signal, a dimmer 103 which generates a dimming signal corresponding to a dimming level, and a light-emitting element (here, an LED module 104) which is turned on by the drive circuit 101.

The drive circuit 101 turns the light-emitting element (here, the LED module 104) on at brightness (hereinafter, also referred to as luminance) corresponding to the dimming signal input from the dimmer 103. The drive circuit 101 includes a diode bridge 105, a fail-safe circuit 110 formed of a capacitor 106, a resistor 107, a resistor 108, and a switch 109, and a backflow prevention diode 111, and an emission control module 112. Here, the resistor 108 and the switch 109 form a bypass circuit 113 which is a bypass path for the resistor 107. Details of the drive circuit 101 will be described below.

The AC power source 102 supplies an alternating current, and is, for example, a mains supply of 100 V.

The dimmer 103 is a phase-control dimmer which converts the alternating current signal supplied by the AC power source 102 into a dimming signal. The dimming signal is a signal which has an AC voltage waveform a fraction of which is cut off. The dimmer 103 phase-controls the alternating current signal, according to the dimming level, to covert it into a dimming signal. More specifically, the dimmer 103 is configured with, for example, a triac which converts the input alternating current signal into a dimming signal which is a signal which has a zero voltage across a phase angle range corresponding to the dimming level.

Figure 12:
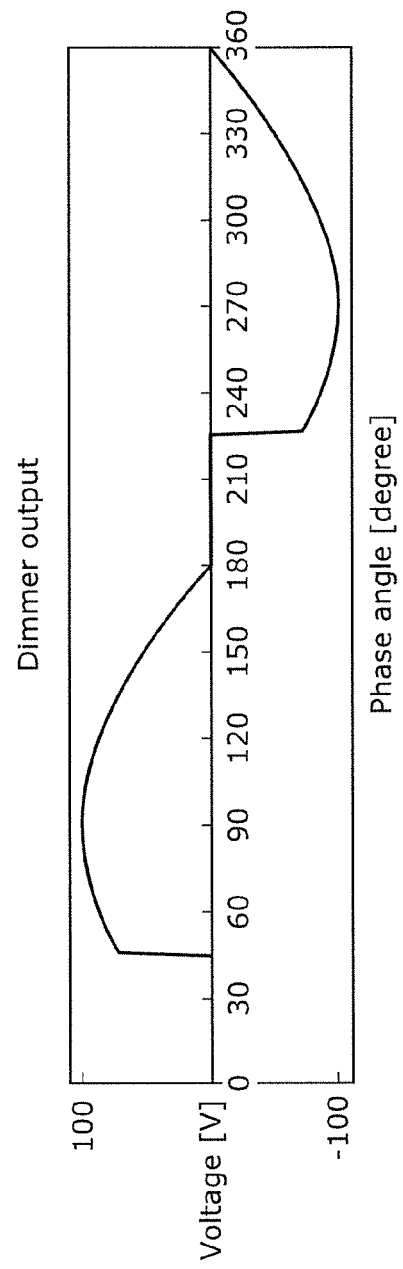
FIG. 12 is a graph depicting an example of a waveform of a dimming signal generated by a dimmer.

The dimmer 103 generates a dimming signal as shown in FIG. 12, for example. FIG. 12 is a graph depicting an example of a waveform of the dimming signal generated by the dimmer 103.

As shown in the figure, the dimmer 103 sets a voltage of the input alternating current signal to 0 V across the phase angle range corresponding to a designated dimming level to generate the dimming signal. Specifically, referred to the phase angle of 0 degree, which is a phase when an AC voltage is brought to 0 V (also referred to as zero-crossing), the dimmer 103 sets the voltage of the alternating current signal to 0 V across a phase angle range from the phase angle of 0 degree to a phase angle (e.g., 45 degree) corresponding to the designated dimming level. The dimmer 103 then raises the voltage of the dimming signal at the phase angle corresponding to the designated dimming level to a voltage of the alternating current signal supplied by the AC power source 102. Such a phase angle at which the dimmer 103 raises the dimming signal is known as a firing angle.

It should be noted that the dimming signal generated by the dimmer 103 is not limited to a signal of a leading edge type in which a leading edge of an alternating current signal is cut off as a function of the dimming level, as shown in FIG. 12. Specifically, the dimming signal may be a phase-controlled dimming signal, for example, a signal of a trailing edge type.

The LED module 104 is one aspect of the light-emitting element and emits light which has brightness corresponding to the current supplied by the drive circuit 101. In other words, the LED module 104 illuminates at a luminance corresponding to the current supplied by the drive circuit 101. The LED module 104 includes, for example, a plurality of LED chips mounted on one side of a mounting board. It should be noted that the light-emitting element may be other than an LED, and, for example, a semiconductor laser, an organic EL element, or an inorganic EL element may be used.

Next, referring to FIG. 11, detailed configuration of the drive circuit 101 shown in FIG. 10 will be described.

The diode bridge 105 rectifies the dimming signal output from the dimmer 103 and outputs the rectified dimming signal to a subsequent component, i.e., the emission control module 112. It should be noted that the circuits (the diode bridge 105, the fail-safe circuit 110, the diode 111, and the emission control module 112) included in the drive circuit 101 use potential at the low-side output terminal of the diode bridge 5 as reference potential.

The fail-safe circuit 110 includes the capacitor 106 connected between the output ends of the diode bridge 105 which rectifies the dimming signal, the resistor 107 connected in parallel to the capacitor 106, and the bypass circuit 113 connected in parallel to the resistor 107. The bypass circuit 113 includes the resistor 108 and the switch 109 which are serially connected. The switch 109 turns on if a voltage between the output ends of the diode bridge 105 is less than or equal to a predetermined threshold voltage.

This allows promptly discharging electric charge accumulated in the capacitor 106 via the bypass circuit 113 when the voltage between the output ends of the diode bridge 105 drops to the predetermined threshold voltage. As a result, the malfunction of the dimmer 103 which supplies the dimming signal can be reduced. Why the malfunction of the dimmer 103 can be reduced by the fail-safe circuit 110 will be explained below.

In the bypass circuit 113, specifically, one end of the resistor 108 is connected to one end of the resistor 107, and the other end of the resistor 108 is connected to the other end of the resistor 107 via the switch 109. In doing so, the resistor 108 becomes connected in parallel to the resistor 107, i.e., the resistor 108 becomes connected in parallel to the capacitor 106, when the voltage between the output ends of the diode bridge 105 drops to the predetermined threshold voltage. Thus, the electric charge accumulated in the capacitor 106 can be promptly discharged via the resistor 108 and the switch 109.

The backflow prevention diode 111 has an input terminal connected to the diode bridge 105, the fail-safe circuit 110, a voltage sensing circuit 206, and a control signal generating unit 208, and an output terminal connected to a dimming control circuit 207. This prevents backflow of the current from the dimming control circuit 207, which is a subsequent circuit following the diode 111, back to the fail-safe circuit 110, the voltage sensing circuit 206, and the control signal generating unit 208 which are preceding circuits followed by the diode 111.

The emission control module 112 converts the dimming signal supplied by the dimmer 103 into a current, and supplies the current to the LED module 104, thereby causing the LED module 104 to emit light. This allows the LED module 104 to emit light at the brightness corresponding to the dimming level. The emission control module 112, specifically, includes the voltage sensing circuit 206, the dimming control circuit 207, and the control signal generating unit 208.

The voltage sensing circuit 206 detects the voltage between the output ends of the diode bridge 105, and turns the switch 109 on and off in response to the detected voltage. Specifically, the voltage sensing circuit 206 turns the switch 109 on if the voltage between the output ends of the diode bridge 105 is less than or equal to the predetermined threshold voltage, and turns the switch 109 off if the voltage between the output end of the diode bridge 105 is greater than the predetermined threshold voltage. For example, the voltage sensing circuit 206 is configured of a comparator and a voltage divider circuit which is formed of a plurality of resistors, and the switch 109 is configured of a MOS transistor.

The dimming control circuit 207 converts into a current a voltage indicated by a control signal generated by the control signal generating unit 208, and supplies the current to the LED module 4, thereby causing the LED module 4 to emit light. The dimming control circuit 207 includes a noise filter-and-smoothing circuit 210, a lighting circuit 220, a control circuit 230, and a switching element 240.

The noise filter-and-smoothing circuit 210 removes noise from the rectified dimming signal output from the diode 111 and smoothes the rectified dimming signal. The noise filter-and-smoothing circuit 210 includes a coil 211, and capacitors 212 and 213.

The lighting circuit 220 receives input of a DC voltage smoothed, rectified, and output from the noise filter-and-smoothing circuit 210, and generates the current to be supplied to the LED module 104. Specifically, the lighting circuit 220 includes a choke coil 221 for chopping an input signal voltage, a diode 222 for regenerating energy accumulated in the choke coil 221, and a smoothing capacitor 223. The choke coil 221, the diode 222, and the LED module 104 are connected so as to form a circuit loop. The capacitor 223 is connected in parallel to the LED module 104 and smoothes an output voltage (and an output current) of the lighting circuit 220.

The control circuit 230 and the switching element 240 drive the current through the choke coil 221 included in the lighting circuit 220, in response to the control signal output from the control signal generating unit 208. Specifically, the control circuit 230 turns the switching element 240 on and off, depending on a voltage of the control signal output from the control signal generating unit 208, thereby allowing and preventing the current flow through the choke coil 221. For example, the control circuit 230 generates a pulse frequency modulation (PFM) signal which has a frequency according to the input control signal, so that the higher the voltage of the control signal input is, the higher the frequency the PFM signal generated has. Consequently, the higher the frequency of the PFM signal is the more the energy is accumulated by the switching element 240 into the choke coil 221.

Thus, the higher the voltage of the control signal input from the control signal generating unit 208 to the control circuit 230 is, the larger the current the control circuit 230 and the switching element 240 pass through the choke coil 221. In other words, the higher the voltage of the control signal is the larger the current passes through the LED module 104, thereby increasing the luminance of the LED module 104. In other words, the higher the voltage of the control signal is the brighter the LED module 104 is illuminated.

It should be noted that the control circuit 230 may turn the switching element 240 on and off by generating a pulse width modulation (PWM) signal, so that the higher the voltage of the input control signal is the higher the duty ratio the PWM signal generated has.

The control signal generating unit 208 is a circuit which outputs, as the control signal to the control circuit 230, a voltage obtained by integrating a voltage which is of the dimming signal rectified by the diode bridge 105 and is greater than a predetermined voltage. Specifically, the control signal generating unit 208 is connected to and interposed between the high-side output end and the low-side output end of the diode bridge 105, and includes a Zener diode 281, a Zener diode 286, a resistor 283, and a resistor 284 serially connected in the listed order starting from the high-side output end of the diode bridge 105, and a capacitor 285 connected in parallel to the resistor 284. According to this configuration, the voltage of the control signal output from the control signal generating unit 208 corresponds to the voltage of the rectified dimming signal greater than a sum of a breakdown voltage of the Zener diode 281 and a breakdown voltage of the Zener diode 286.

In other words, the voltage of the control signal output from the control signal generating unit 208 is a voltage corresponding to the firing angle of the dimming signal, i.e., the voltage corresponding to the dimming level. Specifically, the voltage of the control signal increases with a decrease in firing angle of the dimming signal (with an increase in dimming level). As a result, the emission control module 112 can cause the LED module 104 to emit light at the brightness corresponding to the dimming level.

In this manner, the emission control module 112 causes the voltage sensing circuit 206 to turn the switch 109 on if the voltage of the rectified dimming signal is less than or equal to the predetermined threshold voltage. The emission control module 112 also causes the control signal generating unit 208 and the dimming control circuit 207 to convert the dimming signal supplied by the dimmer 103 into a current and supply the current to the LED module 104, thereby causing the LED module 104 to emit light.

Next, reasons why the malfunction of the dimmer 103 can be reduced by the above-mentioned fail-safe circuit 110 will be explained.

Figure 13A:
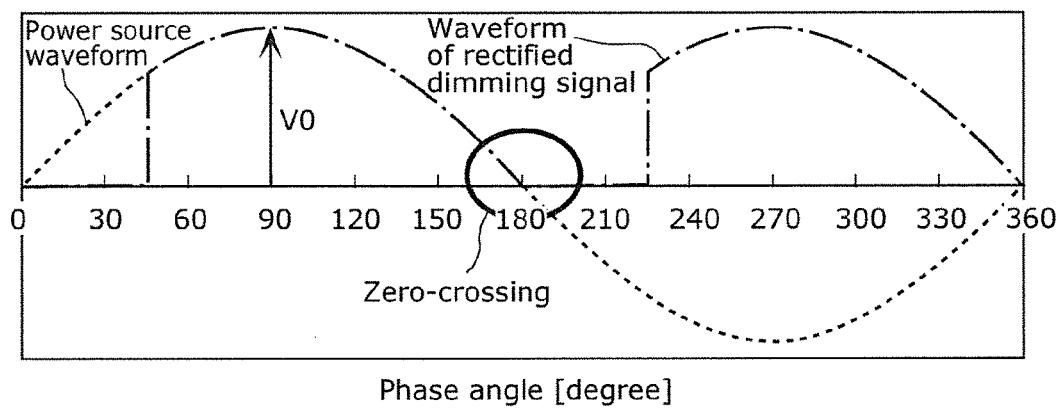
FIG. 13A is a graph depicting a rectified dimming signal.
Figure 13B:
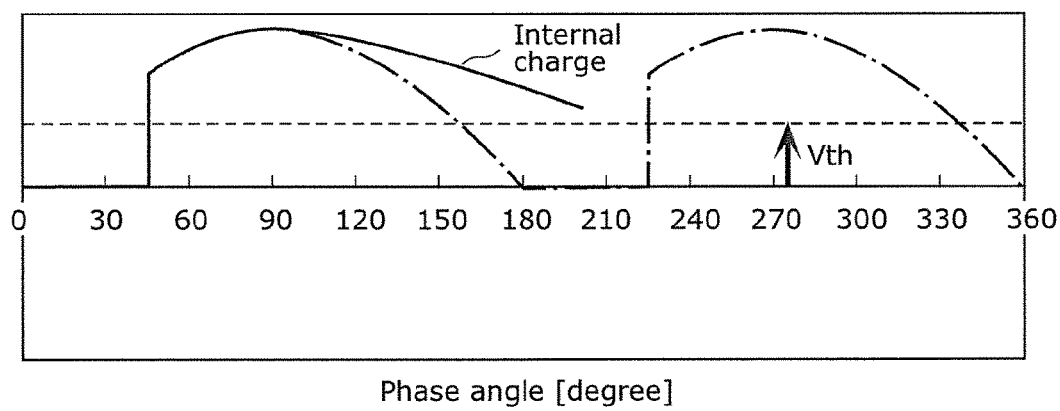
FIG. 13B is a graph depicting a voltage of a capacitor when the internal charge is not zero at zero-crossing.

First, internal charge of the drive circuit 101 configured as set forth above and according to the present embodiment will be described, with reference to FIGS. 13A through 13C. FIG. 13A is a graph depicting a rectified dimming signal. FIG. 13B is a graph depicting a voltage of the capacitor 106 when the internal charge is not zero at zero-crossing. FIG.

13C is a graph depicting a voltage of the capacitor 106 when the internal charge is zero at the zero-crossing.

FIG. 13A depicts a power source waveform which is a voltage waveform of the alternating current signal supplied by the AC power source 102, and a voltage waveform of the dimming signal which is a signal converted by the dimmer 103 into an alternating current signal which has a firing angle corresponding to the dimming level.

As described above, the dimmer 103 sets the voltage of the input alternating current signal to 0 V across the phase angle range corresponding to the designated dimming level to generate the dimming signal. Specifically, referred to a phase angle when the AC voltage is 0 V (zero-crossing), the dimmer 3 sets the voltage of alternating current signal to 0 V across a range starting from this phase angle to a firing angle corresponding to the designated dimming level. Thus, detecting zero-crossing of the AC voltage is an important requirement for the dimmer 103 to generate the dimming signal.

Here, the operation of the dimmer 103 is influenced by the AC power source 102 as well as by the drive circuit 101 which is load on the dimmer 103. Specifically, if the drive circuit 101 possesses internal charge at zero-crossing of the AC voltage, the dimmer 103 may not be able to detect the zero-crossing of the AC voltage. If the dimmer 103 fails to detect the zero-crossing, the dimmer 103 may fail to output the dimming signal or fail to generate the dimming signal at an appropriate firing angle in the next period of the dimming signal, or may be halted in the next and the subsequent periods of the dimming signal. In other words, the dimmer 103 failing to detect zero-crossing causes malfunction of the dimmer 103.

Specifically, if electric charge remains in the drive circuit 101 at the zero-crossing of the AC power source 102, the voltage in the drive circuit 101 is higher than a source voltage for a certain period after the zero-crossing. As a result, impedance of the drive circuit 101 seen from the dimmer 103 is extremely high, and thus a current for operating the dimmer 103 cannot be secured. Consequently, the switch, such as the triac, in the dimmer 103 cannot be turned on, ending up causing malfunction of the dimmer 103.

In order to reduce the malfunction of the dimmer 103, the internal charge of the drive circuit 101 needs to be zero at the zero-crossing of the AC voltage.

Meanwhile, an illumination source needs to improve (reduce) noise generated by the illumination source, to prevent the noise from providing, for example, radio interference to another device.

To that end, an illumination source that has dimming functionality needs to increase the capacitance of a capacitor serving as a filter within the illumination source. In other words, the drive circuit 101 needs to include the capacitor 106 that has an increased capacitance.

An increase in capacitance of the capacitor 106, however, extends the discharge time of the capacitor 106, causing a difficulty in bringing the internal charge of the drive circuit 101 to zero at the zero-crossing of the AC voltage.

Specifically, a large capacitance of the capacitor 106 extends a time taken to discharge the electric charge accumulated in the capacitor 106. Hence, as the voltage of the dimming signal decreases from a peak voltage as shown in FIG. 13B, the voltage of the capacitor 106 decreases later than a decrease of the voltage of the dimming signal. In other words the voltage of the capacitor 106 decreases later than a decrease of the voltage of the AC voltage. As a result, the voltage of the capacitor 106 is not brought to zero at the zero-crossing of the AC voltage. In other words, the internal charge of the drive circuit 101 still remains at the zero-crossing of the AC voltage.

This hinders the dimmer 103 from detecting the zero-crossing, ending up causing it malfunctioning. Specifically, the malfunction of the dimmer 103 is caused and flicker in light emitted by the LED module 104 results, for example.

To reduce such malfunction of the dimmer 103, the fail-safe circuit 110 includes the resistor 107 connected in parallel to the capacitor 106, and the bypass circuit 113 connected in parallel to the resistor 107. The bypass circuit 113 includes the resistor 108 and the switch 109 which are serially connected. The switch 109 turns on if the voltage between the output ends of the diode bridge 105 is less than or equal to a predetermined threshold voltage Vth.

Figure 13C:
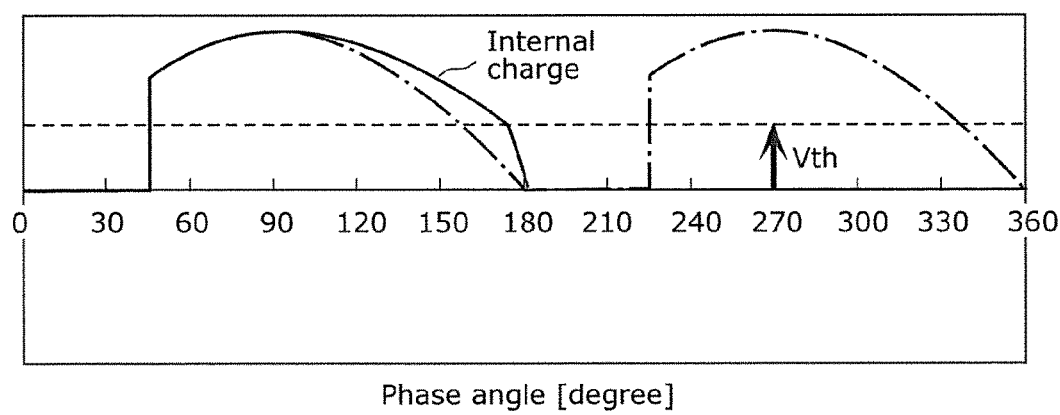
FIG. 13C is a graph depicting a voltage of the capacitor when the internal charge is zero at the zero-crossing.

This can bring the internal charge of the drive circuit 101 to zero at the zero-crossing of the AC voltage as shown in FIG. 13C, which allows the dimmer 103 to successfully detect the zero-crossing. In other words, the malfunction of the dimmer 103 is reduced.

Specifically, the switch 109 turns on when the voltage of the capacitor 106 is less than or equal to the predetermined threshold voltage Vth. This discharges the electric charge accumulated in the capacitor 106 via the resistor 108 and the switch 109. As a result, the internal charge of the drive circuit 101 is smoothly discharged, bringing the internal charge of the drive circuit 101 to zero at the zero-crossing of the AC voltage. Consequently, the dimmer 103 can successfully detect the zero-crossing.

However, if the voltage of the capacitor 106 does not decrease to the predetermined threshold voltage Vth for turning the switch 109 on as shown in FIG. 13B, the switch 109 remains off, ending up with the internal charge remaining in the capacitor 106. The time taken to bring the voltage of the capacitor 106 from the peak voltage of the AC voltage to zero depends on constants of the elements (the capacitor 106, the resistor 107, and the resistor 108).

Therefore, in order to bring the internal charge of the drive circuit 101 to zero at the zero-crossing of the AC voltage, it is necessary that the constants of the capacitor 106, the resistor 107, and the resistor 108 included in the drive circuit 101 according to the present embodiment are as follows:

Specifically, a time t1 and a time t2 satisfy the following equations, the time t1 corresponding to a time from when the AC voltage is at the peak voltage to when the voltage of the capacitor 106 is at the predetermined threshold voltage Vth the time t2 corresponding to a time from when the voltage of the capacitor 106 is at the predetermined threshold voltage Vth to when the voltage of the capacitor 106 is 0 V:

$$t1 = CR1 \times (\ln V0 - \ln Vth)$$

$$t2 = CR2 \times (\ln Vth)$$

where C represents the capacitance value of the capacitor 106, R1 represents the resistance of the resistor 107, R2 represents the resistance of the resistor 108, Vth represents the predetermined threshold voltage at which the switch 109 turns on, V0 represents the amplitude of the alternating current signal, and fs represents the frequency of the alternating current signal. Provided the above equations, C, R1, and R2 satisfy the following Relation 1:

$$t1 + t2 < 1/(3.3 \times fs) \quad \text{(Relation 1)}$$

A time constant of the voltage of the capacitor 106 depends on the capacitance value of the capacitor 106 and the resistance of the resistor 107 during a period from when the AC voltage is at the peak voltage to when the voltage of the capacitor 106 is at the predetermined threshold voltage Vth. The time constant of the voltage of the capacitor 106 depends on the capacitance value of the capacitor 106 and the resistance of the resistor 108 during a period from when the switch 109 turns on in response to the voltage of the capacitor 106 being brought to the predetermined threshold voltage Vth to when the voltage of the capacitor 106 is 0 V. The resistance of the resistor 107 and on-resistance of the switch 109 are sufficiently small, as compared with the resistance R2 of the resistor 108.

Thus, the internal charge of the drive circuit 101 can be brought to zero at zero-crossing of the AC voltage if a sum of the time t1 and the time t2 is less than a 1/3.3 of a period of the alternating current signal.

As described above, the drive circuit 101 according to the present embodiment can reduce the malfunction of the dimmer 103 by inclusion of the capacitor 106, the resistor 107, and the resistor 108 which have constants that satisfy Relation 1 described above.

Meanwhile, as described above, the drive circuit 101 needs to improve the noise.

For this reason, the capacitor 106, the resistor 107, and the resistor 108 need to have the constants that satisfy Relation 1 described above and the capacitance of the capacitor 106 needs to be increased in order for the drive circuit 101 to reduce the malfunction of the dimmer 103 as well as reducing the noise.

In the following, effects obtained from the drive circuit 101 according to the present embodiment will be described, while providing a comparative example 1 with reference to a case where the capacitor 106 has a small capacitance, and a comparative example 2 with reference to a case where the capacitor 106, the resistor 107, and the resistor 108 have constants that do not satisfy Relation 1 described above.

Comparative Example 1

First, operation of a drive circuit according to a comparative example 1, and noise generated when the drive circuit according to the comparative example 1 is connected to a dimmer 103 will be described.

The drive circuit according to the comparative example 1 has the same configuration as the drive circuit 101 according to the present embodiment shown in FIG. 11, except that a capacitor 106 included in the drive circuit according to the comparative example 1 has a small capacitance. Specifically, the drive circuit according to the comparative example 1 includes the capacitor 106 having a capacitance value C of 0.047 μF, a resistor 107 having a resistance R1 of 100 kΩ, and a resistor 108 having a resistance R2 of 2 kΩ.

Figure 14:
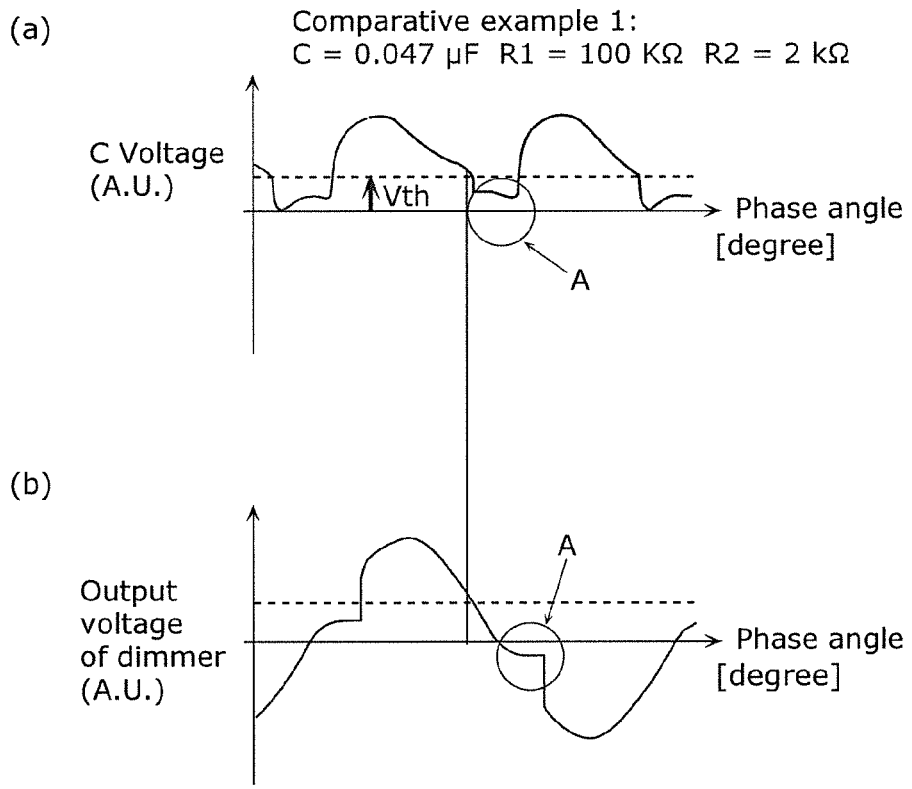
FIG. 14 shows graphs for illustrating operation of a drive circuit according to a comparative example 1 of the embodiment 2.

FIG. 14 shows graphs for illustrating operation of the drive circuit according to the comparative example 1, wherein (a) is a graph depicting a voltage of the capacitor 106 according to the comparative example 1 and (b) is a graph depicting a waveform of an output voltage of the dimmer 103 when the voltage of the capacitor 106 in the comparative example 1 is as shown in (a) of FIG. 14.

As shown in (a) of FIG. 14, the voltage of the capacitor 106 promptly decreases once it reached a predetermined threshold voltage Vth.

Here, the voltage of the capacitor 106 is not 0 V in a portion A in (a) of FIG. 14. This is because a control signal generated by a control signal generating unit 208 passes through the capacitor 106 via the resistor 108 and a switch 109 during a period where the dimmer 103 is off.

Specifically, the internal charge of the drive circuit 101 is brought to zero at zero-crossing of an AC voltage as described with reference to FIGS. 13A to 13C. Although the voltage of the capacitor 106 is ideally brought to zero at the zero-crossing of the AC voltage, in practice, the voltage of the capacitor 106 is not brought to zero at the zero-crossing due to peripheral circuits. Hence, bringing the internal charge of the drive circuit 101 to zero at the zero-crossing of the AC voltage in an ideal circuit corresponds to the internal charge of the drive circuit 101 having no time dependent properties in a phase angle range (hereinafter, referred to as an off-period of the dimmer 103) from the zero-crossing of the AC voltage to a firing angle of a dimming signal in an actual circuit.

The internal charge of the drive circuit 101 is not brought to zero during the off-period of the dimmer 103 for the following reasons. The dimmer 103, even in the off-period, needs to be supplied externally with power to be used to operate a switch (e.g., the triac) included in the dimmer 103 so as to raise the dimming signal in the next period of the dimming signal. Specifically, a certain amount of a current for supplying power needs to be passed through the dimmer 103 via the lamp which includes the drive circuit 101 and the LED module 104 serially connected to the dimmer 103. At this time, the current passes through the resistor 108. This drops the voltage of the resistor 108, thereby generating a voltage. Thus, a voltage corresponding to the voltage drop in the resistor 108 is generated as well in the capacitor 106 which is connected in parallel to the resistor 108. As described above, the internal charge of the drive circuit 101 is not brought to zero at the zero-crossing of the AC voltage due to the voltage generated in the capacitor 106 during the off-period of the dimmer 103.

However, if the capacitor 106 does not discharge electric charge during the off-period of the dimmer 103, the dimmer 103 can successfully detect the zero-crossing of the AC voltage even if the voltage of the capacitor 106 is not brought to zero at zero-crossing of the AC voltage as shown in a portion A in (a) of FIG. 14.

An output voltage of the dimmer 103 is offset in a portion A in (b) of FIG. 14. This is due to a fact that the voltage of the capacitor 106 is not 0 V during the off-period of the dimmer 103. However, the offset of the output voltage of the dimmer 103 does not affect the detection of the zero-crossing of the AC voltage by the dimmer 103, as described above.

As a result, the drive circuit according to the comparative example 1 can reduce the malfunction of the dimmer 103.

Next, noise generated when the drive circuit according to the comparative example 1 is connected to the dimmer 103 will be described.

Figure 15:
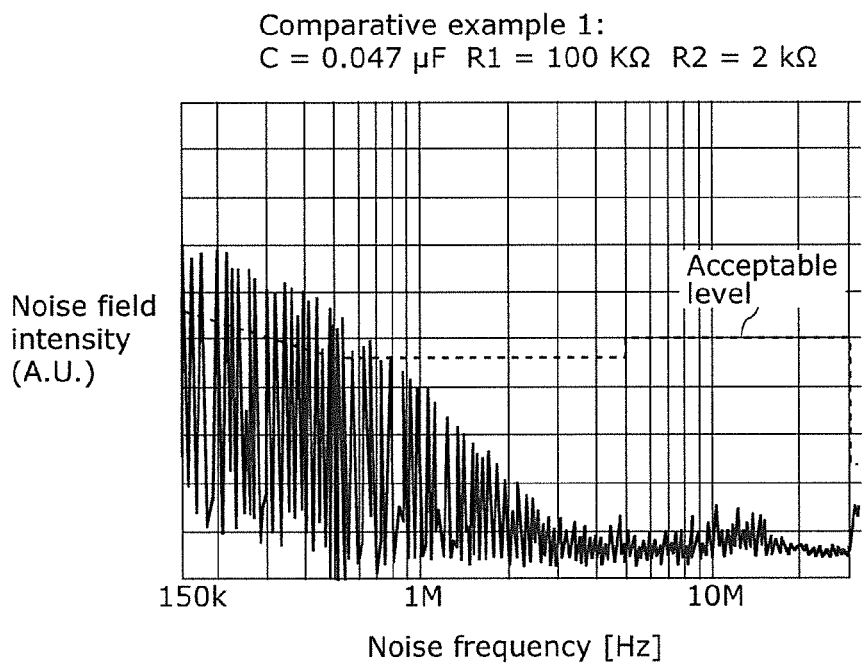
FIG. 15 is a graph depicting noise generated when the drive circuit and a dimmer according to the comparative example 1 of the embodiment 2 are connected to each other.

FIG. 15 is a graph depicting the noise generated when the drive circuit according to the comparative example 1 and the dimmer 103 are connected to each other, wherein a noise frequency is indicated on the horizontal axis and noise field intensity is indicated on the vertical axis.

In the figure, an example of an acceptable level of the noise field intensity is depicted. The acceptable level is an acceptable value according to Electrical Appliance and Material Safety Law or the like.

FIG. 15 depicts that, when the drive circuit according to the comparative example 1 and the dimmer 103 are connected, the noise field intensity is less than the acceptable level at a frequency of about 800 kHz or higher, whereas the noise field intensity is greater than or equal to the acceptable level at a frequency lower than about 800 kHz.

As described above, the configuration where the drive circuit according to the comparative example 1 includes the capacitor 106 which has a small capacitance does not improve the noise in a low frequency domain (e.g., 800 kHz or lower), although the malfunction of the dimmer 103 is reduced.

Comparative Example 2

To reduce the noise generated when the drive circuit is connected to the dimmer 103, it is contemplated to increase the capacitance of the capacitor 106. Thus, consider a drive circuit which includes a capacitor 106 having a larger capacitance than that of the capacitor 106 according to the comparative example 1 as a drive circuit according to a comparative example 2. In the following, operation of the drive circuit according to the comparative example 2 will be described.

The drive circuit according to the comparative example 2 has the same configuration as the drive circuit according to the comparative example 1, except that the capacitor 106 included in the drive circuit according to the comparative example 2 has a large capacitance. Specifically, the drive circuit according to the comparative example 2 includes the capacitor 106 having a capacitance value C of 0.1 μF, a resistor 107 having a resistance R1 of 100 kΩ, and a resistor 108 having a resistance R2 of 2 kΩ. In other words, the drive circuit according to the comparative example 2 has a configuration in that constants of the capacitor 106, the resistor 107, and the resistor 108 do not satisfy Relation 1 described above, while the capacitor 106 has a large capacitance.

Figure 16:
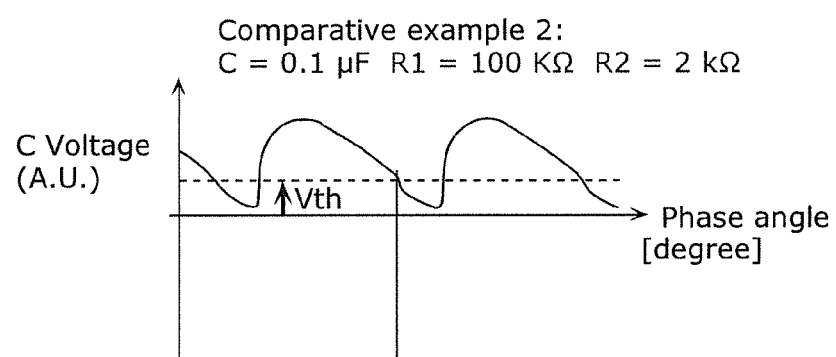
FIG. 16 shows graphs for illustrating operation of a drive circuit according to a comparative example 2 of the embodiment 2.
Figure 16:
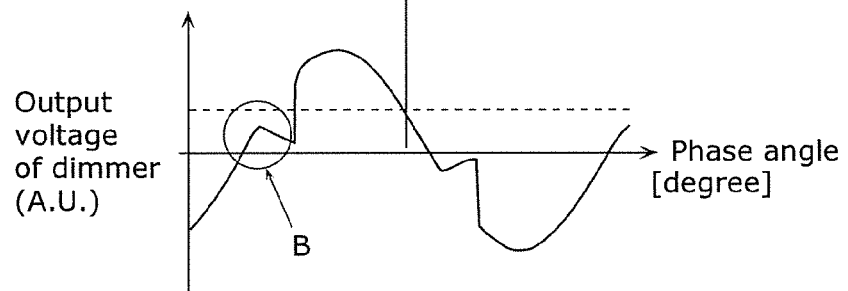

FIG. 16 shows graphs for illustrating operation of the drive circuit according to the comparative example 2, wherein (a) is a graph depicting a voltage of the capacitor 106 according to the comparative example 2 and (b) is a graph depicting a waveform of an output voltage of the dimmer 103 when the voltage of the capacitor 106 according to the comparative example 2 is as shown in (a) of FIG. 16.

Comparing (a) of FIG. 16 with (a) of FIG. 14, the voltage of the capacitor 106 in (a) of FIG. 16 is the same as (a) of FIG. 14 in that the voltage promptly decreases once it reached a predetermined threshold voltage Vth, except that the voltage of the capacitor 106 (a) of FIG. 16 continues to decrease during the off-period of the dimmer 103, without being constant.

This means that an increase in capacitance of the capacitor 106 causes the capacitor 106 to discharge even during the off-period of the dimmer 103, i.e., at and subsequent to the zero-crossing of the AC voltage.

As a result, the output voltage of the dimmer 103 connected to the drive circuit according to the comparative example 2 has a deformed waveform in a portion B in (b) of FIG. 16. In other words, malfunction of the dimmer 103 is caused in which the dimmer 103 is unable to output a dimming signal corresponding to a dimming level.

It is contemplated that the drive circuit according to the comparative example 2 has the capacitor 106 having a large capacitance as described above, as compared with the comparative example 1, and thereby the noise when the drive circuit is connected to the dimmer 103 is reduced. However, since the constants of the capacitor 106, the resistor 107, and the resistor 108 do not satisfy Relation 1 described above, and the discharging by the capacitor 106 is not completed at the zero-crossing of the AC voltage. As a result, the malfunction of the dimmer 103 is caused, resulting in the deformed waveform in the output voltage of the dimmer 103.

Effects from Embodiment 1

Comparing with the drive circuit according to the comparative examples 1 and 2 described above, the drive circuit 101 according to the present embodiment includes the capacitor 106, the resistor 107, the resistor 108 which have constants that satisfy Relation 1 described above, and, additionally, the capacitance value of the capacitor 106 satisfies the following relation:

$$C > 0.047 \text{ μF} \qquad \text{(Relation 2)}$$

This allows the drive circuit 101 according to the present embodiment to reduce the malfunction of the dimmer 103 as well as reducing the noise. In the following, operation of the drive circuit 101 according to the present embodiment and noise generated when the drive circuit 101 according to the present embodiment is connected to the dimmer 103 will be described.

As described above, the drive circuit 101 according to the present embodiment includes the capacitor 106, the resistor 107, and the resistor 108 which have constants that satisfy Relations 1 and 2 described above. Specifically, the drive circuit 101 according to the present embodiment includes the capacitor 106 having a capacitance value C of 0.1 μF, the resistor 107 having a resistance of R1 of 47 kΩ, and the resistor 108 having a resistance R2 of 2 kΩ.

Figure 17:
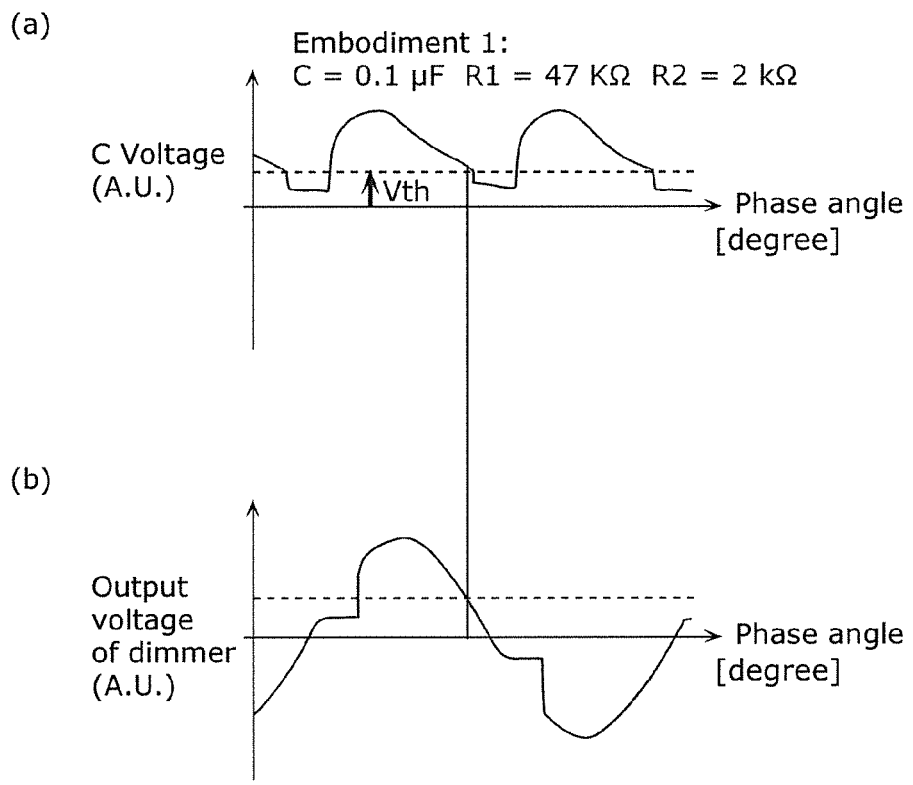
FIG. 17 shows graphs for illustrating operation of the drive circuit according to the embodiment 2.

FIG. 17 shows graphs for illustrating operation of the drive circuit 101 according to the present embodiment, wherein (a) is a graph depicting a voltage of the capacitor 106 included in the drive circuit 101 and (b) is a graph depicting a waveform of an output voltage of the dimmer 103 when the voltage of the capacitor 106 according to the present embodiment is as shown in (a) of FIG. 17.

Comparing (a) of FIG. 17 with (a) of FIG. 14 and (a) of FIG. 16, the voltage of the capacitor 106 in (a) of FIG. 17 is the same as (a) of FIG. 14 and (a) of FIG. 16 in that the voltage promptly decreases once it reached a predetermined threshold voltage Vth. Also, the voltage of the capacitor 106 in (a) of FIG. 17 is constant during the off-period of the dimmer 103, as with (a) of FIG. 14, which offsets the output voltage of the dimmer 103 during the off-period of the dimmer 103, as shown in (b) of FIG. 17.

As described with reference to the comparative example 1, the offset of the voltage of the capacitor 106 during the off-period of the dimmer 103 does not affect the detection of the zero-crossing of the AC voltage by the dimmer 103.

As a result, the output voltage of the dimmer 103 shown in (b) of FIG. 17 does not include a deformed waveform as indicated by the portion B in (b) of FIG. 16. In other words, the drive circuit 101 according to the present embodiment can reduce the malfunction of the dimmer 103 connected to the drive circuit 101.

Next, noise generated in the drive circuit 101 according to the present embodiment will be described.

Figure 18:
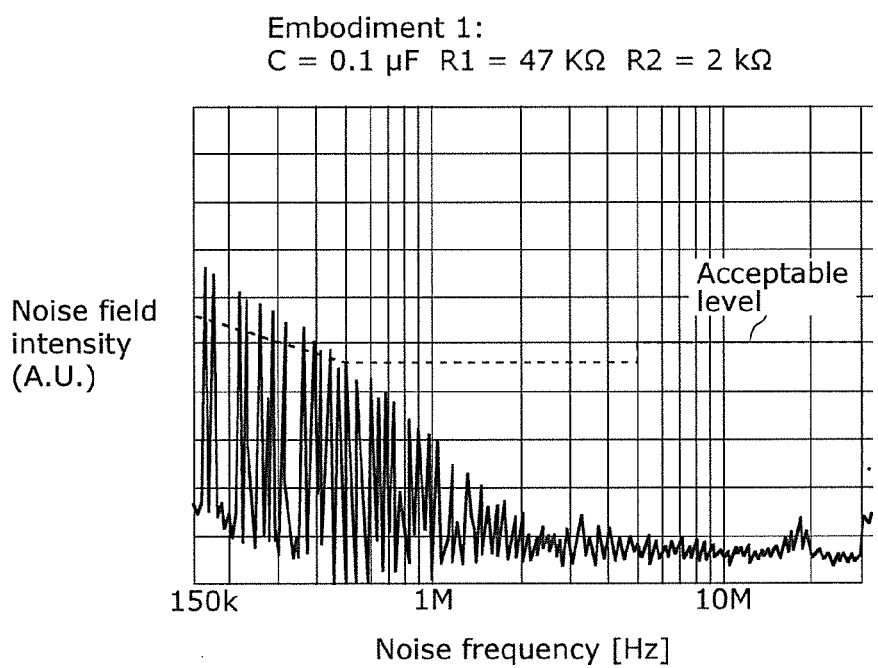
FIG. 18 is a graph depicting noise generated when the drive circuit and a dimmer according to the embodiment 2 are connected to each other.

FIG. 18 is a graph depicting noise generated when the drive circuit 101 and the dimmer 103 according to the present embodiment are connected to each other, wherein a noise frequency is indicated on the horizontal axis and noise field intensity is indicated on the vertical axis. It should be noted that the horizontal and vertical axes in the figure are at the same scales as those in FIG. 15, and the same acceptable level as FIG. 15 is indicated.

Comparing FIG. 18 with FIG. 15, it can be seen that the noise field intensity depicted in FIG. 18 is improved overall, as compared with the noise field intensity depicted in FIG. 15, and is significantly improved, in particular, in a low frequency domain of 800 kHz or lower. It can be seen, for example, that the noise field intensity depicted in FIG. 18 is less than the acceptable level in a frequency domain of about 500 kHz or higher. Meanwhile, the noise field intensity depicted in FIG. 15 is greater than or equal to the acceptable level in a frequency domain lower than about 800 kHz. It can be seen as described above that in the drive circuit 101 according to the present embodiment, the noise generated when the drive circuit 101 is connected to the dimmer 103 is improved in the low frequency domain, as compared with the drive circuit according to the comparative example 1.

In other words, by including the capacitor 106 that has the capacitance value C of 0.1 µF, the drive circuit 101 according to the present embodiment can improve noise in the low frequency domain, as compared with the comparative example 1.

While FIGS. 15 and 18 each show an example of the acceptable level in every frequency domain, the acceptable level may be defined in a part of the frequency domain. For example, if the acceptable level has an acceptable value according to Electrical Appliance and Material Safety Law, the acceptable level is defined in a frequency domain where the frequency is 526.5 kHz or higher. In other words, it is not problematic that the noise field intensity in a frequency domain outside the defined range (the frequency is less than 526.5 kHz) is exceeding the acceptable level in FIGS. 15 and 18.

While the capacitor 106 included in the drive circuit 101 according to the present embodiment has the capacitance value C of 0.1 µF, the capacitance value of the capacitor 106 is not limited thereto. Specifically, the capacitance value C of the capacitor 106 may satisfy: C>0.047 µF. If the capacitor 106 has a capacitance value C satisfying C>0.047 µF, the noise generated when the drive circuit 101 is connected to the dimmer 103 can be below the acceptable level in a lower frequency domain than the comparative example 1. In other words, the noise in the low frequency domain can be reduced.

SUMMARY

As described above, the drive circuit 101 according to the present embodiment is a drive circuit which causes a light-emitting element to emit light, using a dimming signal which is an alternating current signal which has been phase-controlled in response to a dimming level, the drive circuit 101 including the capacitor 106 connected between the output ends of the diode bridge 105 which rectifies the dimming signal, the resistor 107 connected in parallel to the capacitor 106, and the bypass circuit 113 connected in parallel to the resistor 107. The bypass circuit 113 includes the resistor 108 and the switch 109 which are serially connected. The switch 109 turns on if a voltage between the output ends of the diode bridge 105 is less than or equal to a predetermined threshold voltage. the capacitor 106, the resistor 107, and the resistor 108 respectively have capacitance, resistance, and resistance that satisfy Relations 1 and 2 described above, provided that $t1=C \times R1 \times (\ln V0 - \ln Vth)$ and $t2=C \times R2 \times (\ln Vth)$, where C represents the capacitance value of the capacitor 106, R1 represents the resistance of the resistor 107, R2 represents the resistance of the resistor 108, Vth represents the predetermined threshold voltage, V0 represents the amplitude of the alternating current signal, and fs represents the frequency of the alternating current signal.

The capacitor 106, the resistor 107, and the resistor 108 have constants satisfying Relation 1 described above, and thereby the voltage of the capacitor 106 can be made constant at the zero-crossing of the AC voltage. In other words, the discharging by the capacitor 106 can be completed at the zero-crossing of the AC voltage. The malfunction of the dimmer 103 connected to the drive circuit 101 is therefore reduced. Moreover, the capacitor 106 have the capacitance value C satisfying Relation 2 described above, and thereby the noise in the low frequency domain generated when the drive circuit 101 and the dimmer 103 are connected is reduced. In other words, the drive circuit 101 according to the present embodiment can reduce the malfunction of the dimmer 103 and as well as reducing the noise.

It should be noted that the resistor 107, the resistor 108, the capacitor 106, the diode bridge 105, and the emission control module 112 are one aspect of a fourth resistor, a fifth resistor, a second capacitor, a second rectifier circuit, and a second emission control circuit, respectively.

The resistor 108 may have one end connected to one end of the resistor 107, and the other end connected to the other end of the resistor 107 via the switch 109.

In doing so, the resistor 108 becomes connected in parallel to the resistor 107, i.e., the resistor 108 becomes connected in parallel to the capacitor 106, when the voltage between the output ends of the diode bridge 105 is brought to the predetermined threshold voltage. Thus, the electric charge accumulated in the capacitor 106 can be promptly discharged via the resistor 108 and the switch 109.

Moreover, the drive circuit 101 may further include the emission control module 112 which converts the dimming signal into a current and supplies the current to the LED module 104, thereby causing the LED module 104 to emit light.

This can cause the LED module 104 to emit light at a brightness corresponding to a dimming level.

Embodiment 3

An illumination source according to the present embodiment includes the drive circuit 1 according to the embodiment 1, and an LED module 4. Hereinafter, the illumination source according to the present embodiment will be described, with reference to the accompanying drawings.

Figure 19:
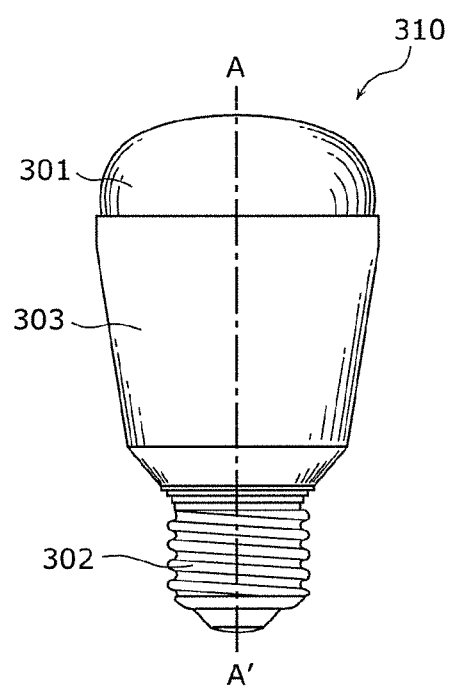
FIG. 19 is an overview of an illumination source according to an embodiment 3.
Figure 20:
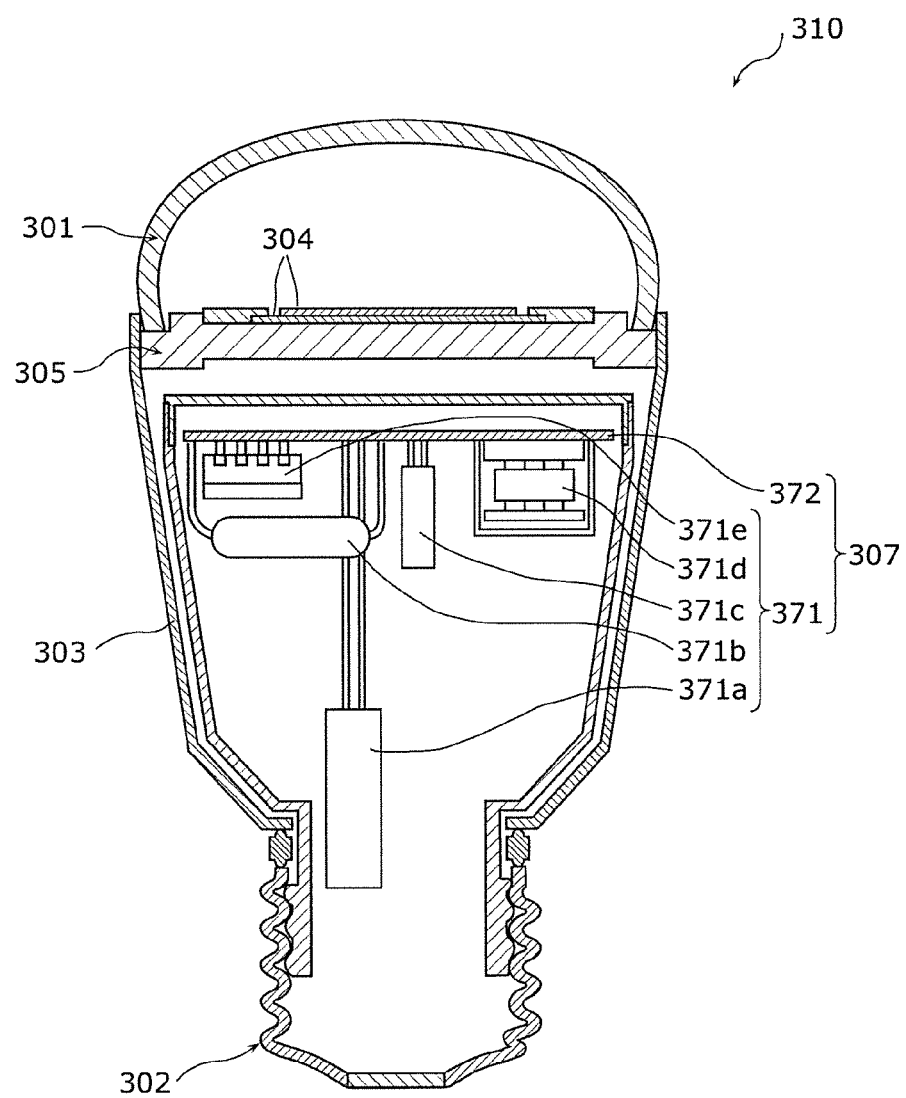
FIG. 20 is a cross-sectional view of the illumination source taken along a plane passing through a central axis A-A' in FIG. 19.

FIG. 19 is an overview of an illumination source 310 according to the present embodiment. FIG. 20 is a cross-sectional view of the illumination source 310 taken along a plane passing through a central axis A-A' in FIG. 19.

The illumination source 310 is a bulb-shaped LED lamp which distributes light omnidirectionally, the illumination source 310 including a lamp envelope configured of a globe 301, a base 302, and an outer case 303 between the globe 301 and the base 302.

The globe 301 is a spherical translucent cover for radiating light emitted from an LED module 304 out of the lamp. The LED module 304 is covered with the globe 301. The globe 301 has undergone a light diffusing treatment, such as a frosted glass treatment, to diffuse the light emitted from the LED module 304. It should be noted that the shape of the globe 301 is not limited to a spherical shape, and may be a half-dome shape, a spheroid shape, or an oblate spheroid shape. In the present embodiment, the globe 301 is made from a glass material. However, the material of the globe 301 is not limited to a glass material and the globe 301 may be molded from a synthetic resin, for example.

The base 302 is a power receiver which receives a dimming signal at two contacts. The dimming signal received by the base 302 is input to a power input on a circuit board 372 via a wire lead (not shown).

As shown in FIG. 20, the illumination source 310 according to the present embodiment further includes the LED module 304, a light source attachment member 305, and a drive circuit 307.

The LED module 304 is the LED module 4 shown in FIG. 1, is by way of example of a light source formed of a semiconductor light-emitting element, and a light-emitting module (a light-emitting unit) which includes an LED which emits predetermined light.

The light source attachment member 305 is a holder (a module plate) formed of a metal substrate for disposing the LED module 304 thereon, and is molded from aluminum die cast in a disc shape.

The drive circuit 307 is the drive circuit 1 according to the embodiment 1 and includes a circuit element group 371 which forms a circuit (a power supply circuit) for causing the LED module 304 to emit light, and the circuit board 372 on which circuit elements of the circuit element group 371 are implemented.

The circuit element group 371 is configured of a plurality of circuit elements for generating, from the dimming signal received by the base 302, power to cause the light source (the LED module 304) to emit light. The circuit element group 371 converts the dimming signal received by the base 302 into a control signal that responds in linearly proportional to a dimming level, and supplies the LED module 304 with a current corresponding to a voltage indicated by the control signal. The circuit element group 371 includes a first capacitor element 371a, which is an electrolytic capacitor (a vertical capacitor), a second capacitor element 371b, which is a ceramic capacitor (a horizontal capacitor), a resistor element 371c, a voltage transformer element 371d comprising a coil, and a semiconductor device 371e which is an integrated circuit of an intelligent power device (IPD).

The circuit board 372 is a disc-shaped printed circuit having the circuit element group 371 mounted on one side. The circuit board 372 includes a notch. The notch forms a path which passes therethrough a wire lead from a surface having the circuit element group 371 mounted thereon to an opposite surface. The wire lead is for supplying the LED module 304 with the current.

The illumination source 310 configured as described above and according to the present embodiment can suppress abrupt change in brightness in response to changes in dimming level.

While the drive circuit 307 included in the illumination source 310 in the present embodiment is the drive circuit 1 according to the embodiment 1, it should be noted that the drive circuit 307 may be the drive circuit according to the variation of the embodiment 1.

Moreover, the drive circuit 307 may be the drive circuit 101 according to the embodiment 2. The illumination source 310 which includes such a drive circuit 101 can reduce the malfunction of a dimmer as well as reducing noise.

Embodiment 4

A lighting device according to the present embodiment includes the illumination source 310 according to the embodiment 3 and a dimmer which generates a dimming signal using an AC power source. Hereinafter, the lighting device according to the present embodiment will be described, with reference to the accompanying drawing.

Figure 21:
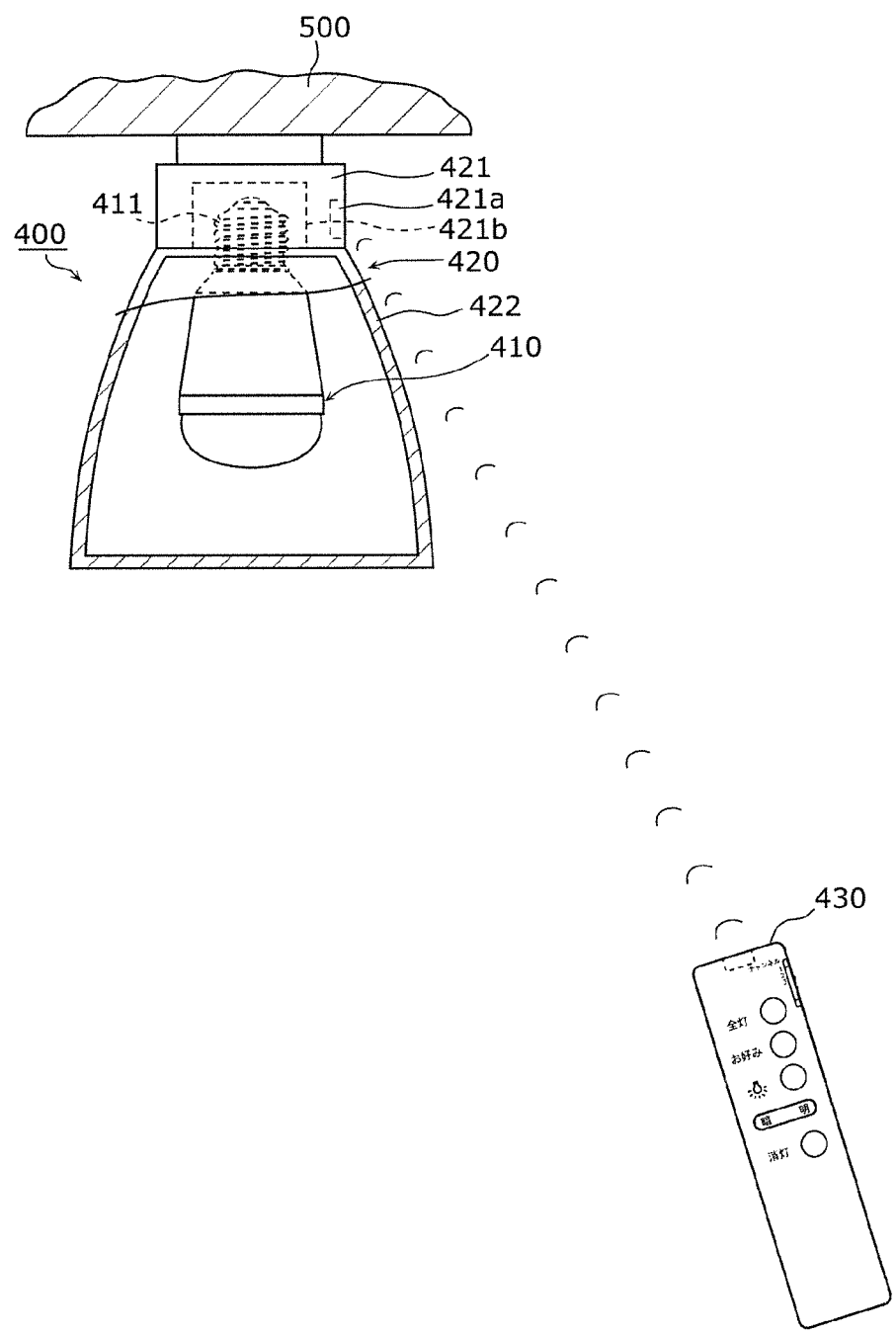
FIG. 21 is a schematic sectional view of a lighting device according to an embodiment 4.

FIG. 21 is a schematic sectional view of a lighting device 400 according to the present embodiment.

The lighting device 400 according to the present embodiment is used, for example, being amounted onto a ceiling 500 in a room. The lighting device 400 includes an illumination source 410, a lighting apparatus 420, and a remote control 430. The illumination source 410 is the illumination source 310 according to the embodiment 3 described above.

The remote control 430 receives user operation of designating a dimming level, and transmits a signal indicating the designated dimming level to the lighting apparatus 420.

The lighting apparatus 420 turns the illumination source 410 off and on, and turns the illumination source 410 on at luminance corresponding to the dimming level. The lighting apparatus 420 includes an apparatus body 421 to be mounted on the ceiling 500, and a lamp cover 422 which covers the illumination source 410.

The apparatus body 421 includes a dimmer 421a, and a socket 421b to which a base 411 of the illumination source 410 is to be screwed. The apparatus body 421 feeds the dimming signal to the illumination source 410 via the socket 421b.

The dimmer 421a is the dimmer 3 shown in FIG. 1 or the dimmer 103 shown in FIG. 10, which is a phase-control dimmer which receives a signal indicative of the dimming level transmitted from the remote control 430 and converts an alternating current signal input from the AC power source into a dimming signal corresponding to the dimming level received.

The lighting device 400 configured as described above and according to the present embodiment does not change its brightness suddenly in response to a dimming level designated by the user. In other words, the lighting device 400 can suppress abrupt change in brightness in response to changes in dimming level.

While the illumination source 410 includes the drive circuit 1 according to the embodiment 1 in the present embodiment, it should be noted that the illumination source 410 may include the drive circuit 101 according to the embodiment 2, in place of the drive circuit 1. The lighting device 400 which includes such a drive circuit 101 can reduce the malfunction of the dimmer 421a as well as reducing noise.

While the drive circuit, the illumination source, and the lighting device according to the present invention have been described with reference to the embodiments and the variations thereof, the present invention is not limited to the embodiments and the variations thereof. Various modifications to the embodiments and the variations thereof that may be conceived by those skilled in the art and any combination of the components of different embodiments and variations are intended to be included within the scope of the one or more aspects of the present invention, without departing from the spirit of the present invention.

While in the above description, the dimmer varies the firing angle in response to a dimming level designated by the user, for example, the way in which the dimmer varies the firing angle is not limited thereto. For example, the dimmer may include an optical sensor and vary the firing angle according to an amount of light received by the optical sensor.

Moreover, while the above description has been provided with reference to the case where the illumination source is a bulb-shaped LED lamp, the present invention is applicable also to illumination sources that have other shapes. For example, the present invention may be applied to linear LED lamps.

Moreover, while the above description has been provided with reference to the case where the lighting device includes the illumination source and the dimmer, the lighting device may include the drive circuit 1 and the LED module 4, without a housing such as the globe and the outer case.

Moreover, the lighting device 400 described above is by way of example, and may be a lighting device which includes the dimmer 421a which converts an alternating current signal into a dimming signal, and the socket 421*b* to which the base 411 of the illumination source 410 is to be screwed. Additionally, while the lighting device 400 shown in FIG. 21 includes one illumination source, the lighting device 400 may include a plural number, e.g., two or more, of the illumination sources.

Moreover, the circuit structures shown in the circuit diagrams above are by way of example and the present invention is not limited to the above circuit structures. For example, the configuration of the control signal generating unit 8 is not limited to that shown in FIG. 3, and may be one in which the positions of the Zener diode 81 and the resistor 82 are interchanged, or the resistor 82 is connected to the low side of the resistor 84. Also for example, the configuration of the fail-safe circuit 110 is not limited to those shown in FIGS. 10 and 11 and may be one in which the positions of the resistor 108 and the switch 109 are interchanged.

Specifically, circuits which can implement the characteristic features of the present invention as with the circuit structures described above are included in the present invention. For example, a certain element having an element, such as a transistor, a resistance element, or a capacitor element connected thereto in series or in parallel is also included in the present invention to an extent that can achieve the same or similar functionality obtained from the circuit structures described above. In other words, "connected" in the above embodiments is not limited to directly connecting two terminals (nodes), and includes connecting two terminals (nodes) via an element to an extent that can achieve the same or similar functionality obtained from the circuit structures described above.

While, in the above description, the diode bridge 5, which is a full-wave rectifier circuit, is included as the rectifier circuit which rectifies the dimming signal, the rectifier circuit is not limited thereto and may be a half-wave rectifier circuit, for example.

In the above description, the switch 109 turns on if the voltage between the output ends of the diode bridge 105 is less than or equal to the predetermined threshold voltage, and turns off when the voltage is greater than the predetermined threshold voltage. In other words, the switch 109 being off turns on at a time when the voltage has fallen to the predetermined threshold voltage, and the switch 109 being on turns off at a time when the voltage has increased higher than the predetermined threshold voltage. The time at which the switch 109 turns off is, however, not limited thereto, and may be in a phase angle range of the alternating current signal greater than a phase angle at which the voltage of the alternating current signal is brought to zero and less than or equal to a phase angle at which the dimming signal rises.

Even with such a configuration, the malfunction of the dimmer 103 is reduced, as with the embodiment 1. This is because the discharging by the capacitor 106 is completed at zero-crossing of the alternating current signal, and thus the dimmer 103 can successfully detect the zero-crossing of the AC voltage. Hence, the switch 109 turning off after the zero-crossing does not affect the detection of the zero-crossing by the dimmer 103.

Likewise, the time at which the voltage sensing circuit 206 turns the switch 109 off is not limited to the time when the voltage between the output ends of the diode bridge 105 has increased greater than the predetermined threshold voltage as described above, and may be in a phase angle range of the alternating current signal greater than a phase angle at which the voltage of the alternating current signal is brought to zero and less than or equal to a phase angle at which the dimming signal rises.

REFERENCE SIGNS LIST

1, 101, 307 Drive circuit
2, 102 AC power source
3, 103 Dimmer
4, 104, 304 LED module (light-emitting element)
5 Diode bridge (first rectifier circuit)
6, 111, 222 Diode
7 Dimming control circuit (first emission control circuit)
8, 180, 208, 980 Control signal generating unit
10, 210 Noise filter-and-smoothing circuit
11, 211 Coil
12, 13, 23, 85, 106, 212, 213, 223, 285, 985 Capacitor
20, 220 Lighting circuit
21, 221 Choke coil
22 Diode
30, 230 Control circuit
40, 181, 240 Switching element
81, 86, 281, 286, 981, 986 Zener diode
82, 83, 84, 107, 108, 182, 183, 283, 284, 983, 984 Resistor
87, 987 Output terminal
88 Node
105 Diode bridge (the second rectifier circuit)
109 Switch
112 Emission control module (second emission control circuit)
206 Voltage sensing circuit
207 Dimming control circuit
301 Globe
302, 411 Base
303 Outer case
305 Light source attachment member
310, 410 Illumination source
371 Circuit element group
371*a* First capacitor element
371*b* Second capacitor element
371*c* Resistor element
371*d* Voltage transformer element
371*e* Semiconductor device
372 Circuit board
400 Lighting device
420 Lighting apparatus
421 Apparatus body
421*a* Dimmer
421*b* Socket
430 Remote control
500 Ceiling

The invention claimed is:
1. A drive circuit for causing a light-emitting element to emit light, using a dimming signal which is an alternating current signal which has been phase-controlled in response to a dimming level, the drive circuit comprising
   a control signal generating unit configured to integrate a voltage of a signal obtained by rectifying the dimming signal to generate a control signal for controlling luminance of the light-emitting element, the voltage being greater than or equal to a first voltage and less than or equal to a second voltage lower than a maximum voltage of the dimming signal;
   a second capacitor connected between output ends of a second rectifier circuit which rectifies the dimming signal;

a fourth resistor connected in parallel to the second capacitor; and a bypass circuit connected in parallel to the fourth resistor, wherein the bypass circuit includes a fifth resistor and a switch which are serially connected, the switch turns on if a voltage between the output ends of the second rectifier circuit is less than or equal to a predetermined threshold voltage, and the second capacitor, the fourth resistor, and the fifth resistor respectively have capacitance, resistance, and resistance that satisfy the following relations, provided that $$t1 = C \times R1 \times (\ln V0 - \ln Vth) \text{ and } t2 = C \times R2 \times (\ln Vth):$$

$$C > 0.047 \, \mu F; \text{ and}$$

$$t1 + t2 < 1/(3.3 \times fs),$$

where C represents the capacitance of the second capacitor, R1 represents the resistance of the fourth resistor, R2 represents the resistance of the fifth resistor, Vth represents the predetermined threshold voltage, V0 represents amplitude of the alternating current signal, and fs represents a frequency of the alternating current signal.

2. The drive circuit according to claim 1, further comprising a first rectifier circuit which rectifies the dimming signal, wherein the control signal generating unit includes:
   a first resistor, a second resistor, and a third resistor serially connected between output terminals of the first rectifier circuit;
   a first capacitor connected in parallel to the third resistor; and
   a first Zener diode connected in parallel to the second resistor and the third resistor and serially connected to the first resistor, and the control signal generating unit is configured to output as the control signal a voltage corresponding to a voltage stored in the first capacitor.

3. The drive circuit according to claim 2, wherein the control signal generating unit is further configured to be serially connected to the first resistor, the second resistor, and the third resistor, and includes a constant voltage circuit serially connected to the first Zener diode, wherein the constant voltage circuit is connected to a high side of the first Zener diode.

4. The drive circuit according to claim 3, wherein the constant voltage circuit is a second Zener diode.

5. The drive circuit according to claim 3, wherein the control signal generating unit further includes a voltage divider circuit which divides the voltage rectified by the first rectifier circuit, and the constant voltage circuit includes a switching element which turns on or off, depending on a voltage obtained by the voltage divider circuit dividing the voltage rectified by the first rectifier circuit, the switching element being serially connected to the first resistor, the second resistor, and the third resistor.

6. The drive circuit according to claim 1, further comprising a first emission control circuit which converts, into a current, a voltage indicated by the control signal generated by the control signal generating unit and supplies the light-emitting element with the current, to cause the light-emitting element to emit light.

7. The drive circuit according to claim 1, wherein the fifth resistor has one end connected to one end of the fourth resistor, and the other end connected via the switch to the other end of the fourth resistor.

8. The drive circuit according to claim 1, wherein the switch is off across a phase angle range of the alternating current signal, the phase angle range being greater than a phase angle at which the voltage of the alternating current signal is brought to zero and less than or equal to a phase angle at which the dimming signal rises.

9. The drive circuit according to claim 1, further comprising a second emission control circuit which converts the dimming signal into a current and supplies the light-emitting element with the current, to cause the light-emitting element to emit light.

10. An illumination source comprising:
the drive circuit according to claim 1; and
the light-emitting element.

11. A lighting device comprising:
the illumination source according to claim 10; and
a dimmer which generates the dimming signal, using an AC power source.

* * * * *